United States Patent
Lee et al.

(10) Patent No.: US 10,958,407 B2
(45) Date of Patent: Mar. 23, 2021

(54) FREQUENCY DIVISION DUPLEXING HYBRID AUTOMATIC REPEAT REQUEST WITH MINI-SLOTS

(71) Applicant: QUALCOMM Incorporated, San Diego, CA (US)

(72) Inventors: Heechoon Lee, San Diego, CA (US); Tingfang Ji, San Diego, CA (US); Joseph Binamira Soriaga, San Diego, CA (US); Alexei Yurievitch Gorokhov, San Diego, CA (US); Peter Gaal, San Diego, CA (US); John Edward Smee, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/002,236

(22) Filed: Jun. 7, 2018

(65) Prior Publication Data

US 2018/0359075 A1  Dec. 13, 2018

Related U.S. Application Data

(60) Provisional application No. 62/517,845, filed on Jun. 9, 2017.

(51) Int. Cl.
*H04L 5/14* (2006.01)
*H04L 1/18* (2006.01)
(Continued)

(52) U.S. Cl.
CPC .............. *H04L 5/14* (2013.01); *H04L 1/1861* (2013.01); *H04L 1/1864* (2013.01);
(Continued)

(58) Field of Classification Search
CPC ......... H04L 5/1423; H04L 5/14; H04L 29/06; H04L 5/143; H04M 11/06
(Continued)

(56) References Cited

U.S. PATENT DOCUMENTS

| 6,788,253 B1* | 9/2004 | Calin | .................... G01S 5/0215 342/357.64 |
| 7,787,430 B2* | 8/2010 | Kaikkonen | ........... H04W 52/44 370/342 |

(Continued)

OTHER PUBLICATIONS

Nokia et al., "Timing aspects for downlink HARQ in NR", 3GPP Draft; R1-1708528_HARQACK_TIMING_FINAL, 3rd Generation Paternership Project (3GPP), Mobile Competence Center; 650, Route Des Lucioles; F-06921 Sophia-Antipolis Cedex; France, vol. RAN WG1, No. Hangzhou; May 15, 2017-May 19, 2017, (May 14, 2017), XP051273720.*

(Continued)

*Primary Examiner* — Peter G Solinsky
*Assistant Examiner* — Sanjay K Dewan
(74) *Attorney, Agent, or Firm* — Linda G. Gunderson; Holland & Hart LLP

(57) ABSTRACT

Methods, systems, and devices for wireless communication are described. A transmitting device may identify a duration of a slot used for communications with a receiving device. The transmitting device may determine that the communications with the receiving device comprises frequency division duplexing (FDD) communications. The transmitting device may transmit communications to the receiving device during a first portion of the slot, a duration of the first portion being less than the duration of the slot and the duration of the first portion is based at least in part on the determination that the communications comprise FDD communications. The transmitting device may select, based at least in part on the determination that the communications comprise FDD com- (Continued)

munications and that the communications are transmitted during the first portion of the slot, a hybrid automatic repeat request (HARQ) scheme to use during the communications.

30 Claims, 16 Drawing Sheets

(51) Int. Cl.
  *H04W 72/04* (2009.01)
  *H04W 4/70* (2018.01)
  *H04L 5/00* (2006.01)
  *H04L 1/16* (2006.01)

(52) U.S. Cl.
  CPC .......... *H04L 5/0055* (2013.01); *H04L 5/0082* (2013.01); *H04W 4/70* (2018.02); *H04W 72/0406* (2013.01); *H04L 1/1671* (2013.01); *H04L 1/1812* (2013.01); *H04L 5/001* (2013.01); *H04L 5/0023* (2013.01); *H04L 5/1469* (2013.01)

(58) Field of Classification Search
  USPC .......................................................... 370/276
  See application file for complete search history.

(56) References Cited

U.S. PATENT DOCUMENTS

| | | | | |
|---|---|---|---|---|
| 8,233,403 B2* | 7/2012 | Yin | H04W 88/06 | 370/252 |
| 8,625,413 B2* | 1/2014 | Shalita | H04L 25/14 | 370/216 |
| 10,735,167 B2* | 8/2020 | Bengtsson | H04L 5/0051 | |
| 2007/0097887 A1* | 5/2007 | Kim | H04B 7/2615 | 370/276 |
| 2008/0119145 A1* | 5/2008 | Lee | H04B 1/0071 | 455/101 |
| 2009/0175232 A1* | 7/2009 | Kolding | H04W 72/042 | 370/329 |
| 2010/0091725 A1* | 4/2010 | Ishii | H04W 72/04 | 370/329 |
| 2012/0294205 A1* | 11/2012 | Fan | H04B 1/006 | 370/280 |
| 2012/0320782 A1* | 12/2012 | Seo | H04B 7/15542 | 370/252 |
| 2013/0051269 A1* | 2/2013 | Suzuki | H04L 1/1877 | 370/252 |
| 2013/0051341 A1* | 2/2013 | Suzuki | H04L 5/0005 | 370/329 |
| 2014/0185495 A1* | 7/2014 | Kuchibhotla | H04L 5/0094 | 370/281 |
| 2014/0187283 A1* | 7/2014 | Nimbalker | H04W 76/14 | 455/550.1 |
| 2015/0078225 A1* | 3/2015 | Yang | H04L 5/001 | 370/280 |
| 2015/0098373 A1* | 4/2015 | Shi | H04L 5/1461 | 370/286 |
| 2015/0229461 A1* | 8/2015 | DiFazio | H04L 5/14 | 370/280 |
| 2015/0358111 A1* | 12/2015 | Marinier | H04L 27/0008 | 370/329 |
| 2016/0337088 A1* | 11/2016 | Quan | H04L 1/1822 | |
| 2018/0007574 A1* | 1/2018 | Park | H04W 72/042 | |
| 2018/0132264 A1* | 5/2018 | Jung | H04L 5/0055 | |
| 2020/0068537 A1* | 2/2020 | Oh | H04L 5/0007 | |
| 2020/0099476 A1* | 3/2020 | Park | H04L 1/1812 | |

OTHER PUBLICATIONS

CATT: "NR-PUCCH Design for Low Latency Communications", 3GPP Draft; R1-1704581, 3rd Generation Partnership Project (3GPP), Mobile Competence Centre, 650, Route Des Lucioles, F-06921 Sophia-Antipolis Cedex, France, vol. RAN WG1, No. Spokane, USA; Apr. 3, 2017-Apr. 7, 2017 Apr. 2, 2017, XP051242720, Retrieved from the Internet: URL:http://www.3gpp.org/ftp/Meetings_3GPP_SYNC/RAN1/Docs/ [retrieved on Apr. 2, 2017], 3 pages.

Huawei et al., "Multiplexing between PUCCHs", 3GPP Draft; R1-1708148, 3rd Generation Partnership Project (3GPP), Mobile Competence Centre, 650, Route Des Lucioles, F-06921 Sophia-Antipolis Cedex, France, vol. RAN WG1, No. Hangzhou, China; May 15, 2017-May 19, 2017 May 14, 2017, XP051273344, Retrieved from the Internet: URL:http://www.3gpp.org/ftp/Meetings_3GPP_SYNC/RAN1/Docs/ [retrieved on May 14, 2017], 3 pages.

Interdigital Communications: "Frame Structure for NR", 3GPP Draft; R1-1610023, 3rd Generation Partnership Project (3GPP), Mobile Competence Centre, 650, Route Des Lucioles, F-06921 Sophia-Antipolis Cedex, France, vol. RAN WG1, No. Lisbon; Oct. 10, 2016-Oct. 14, 2016 Oct. 9, 2016, XP051150048, Retrieved from the Internet: URL:http://www.3gpp.org/ftp/Meetings_3GPP_SYNC/RAN1/Docs/ [retrieved on Oct. 9, 2016], 3 pages.

International Search Report and Written Opinion—PCT/US2018/036674—ISA/EPO—dated Aug. 28, 2018.

Nokia et al., "Timing Aspects for Downlink HARQ in NR", 3GPP Draft; R1-1708528_HARQACK_ TIMING_FINAL, 3rd Generation Partnership Project (3GPP), Mobile Competence Centre, 650, Route Des Lucioles, F-06921 Sophia-Antipolis Cedex, France, vol. RAN WG1, No. Hangzhou; May 15, 2017-May 19, 2017 May 14, 2017, XP051273720, Retrieved from the Internet: URL:http://www.3gpp.org/ftp/Meetings_3GPP_SYNC/RAN1/Docs/ [retrieved on May 14, 2017], 5 pages.

* cited by examiner

FREQUENCY DIVISION DUPLEXING HYBRID AUTOMATIC REPEAT REQUEST WITH MINI-SLOTS

CROSS REFERENCES

The present Application for Patent claims the benefit of U.S. Provisional Patent Application No. 62/517,845 by LEE, et al., entitled "Frequency Division Duplexing Hybrid Automatic Repeat Request with Mini-Slots," filed Jun. 9, 2017, assigned to the assignee hereof, and expressly incorporated herein.

INTRODUCTION

The following relates generally to wireless communication, and more specifically to frequency division duplexing (FDD) hybrid automatic repeat request (HARQ) with mini-slots.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communication system may include a number of base stations or access network nodes, each simultaneously supporting communication for multiple communication devices, which may be otherwise known as user equipment (UE).

Certain wireless communication systems may use various multiplexing techniques to support multiple-access operations. For example, some wireless communication systems may be primarily configured for time division duplexing (TDD) multiplexing. Such TDD configured systems may use downlink-centric, uplink-centric, downlink only and uplink only slot configurations for communicating information, e.g., control information, data, and the like. Such TDD configured systems may also use HARQ processes that include transmitting HARQ feedback information (e.g., acknowledgement/negative acknowledgement (ACK/NACK) information) in a slot subsequent to the slots that the information was received in. This generally increases latency in these TDD configured wireless communication systems.

SUMMARY

A method of wireless communication is described. The method may include identifying a duration of a slot used for communications with a receiving device, determining that the communications with the receiving device comprises FDD communications, transmitting communications to the receiving device during a first portion of the slot, a duration of the first portion being less than the duration of the slot and the duration of the first portion is based at least in part on the determination that the communications comprise FDD communications, and selecting, based at least in part on the determination that the communications comprise FDD communications and that the communications are transmitted during the first portion of the slot, a HARQ scheme to use during the communications.

An apparatus for wireless communication is described. The apparatus may include means for identifying a duration of a slot used for communications with a receiving device, means for determining that the communications with the receiving device comprises FDD communications, means for transmitting communications to the receiving device during a first portion of the slot, a duration of the first portion being less than the duration of the slot and the duration of the first portion is based at least in part on the determination that the communications comprise FDD communications, and means for selecting, based at least in part on the determination that the communications comprise FDD communications and that the communications are transmitted during the first portion of the slot, a HARQ scheme to use during the communications.

Another apparatus for wireless communication is described. The apparatus may include a processor, memory in electronic communication with the processor, and instructions stored in the memory. The instructions may be operable to cause the processor to identify a duration of a slot used for communications with a receiving device, determine that the communications with the receiving device comprises FDD communications, transmit communications to the receiving device during a first portion of the slot, a duration of the first portion being less than the duration of the slot and the duration of the first portion is based at least in part on the determination that the communications comprise FDD communications, and select, based at least in part on the determination that the communications comprise FDD communications and that the communications are transmitted during the first portion of the slot, a HARQ scheme to use during the communications.

A non-transitory computer readable medium for wireless communication is described. The non-transitory computer-readable medium may include instructions operable to cause a processor to identify a duration of a slot used for communications with a receiving device, determine that the communications with the receiving device comprises FDD communications, transmit communications to the receiving device during a first portion of the slot, a duration of the first portion being less than the duration of the slot and the duration of the first portion is based at least in part on the determination that the communications comprise FDD communications, and select, based at least in part on the determination that the communications comprise FDD communications and that the communications are transmitted during the first portion of the slot, a HARQ scheme to use during the communications.

Some examples of the method, apparatus, and non-transitory computer-readable medium described above may further include processes, features, means, or instructions for selecting a duration for a second portion of the slot based at least in part on receiving a HARQ feedback message during the second portion of the slot.

Some examples of the method, apparatus, and non-transitory computer-readable medium described above may further include processes, features, means, or instructions for configuring a mini-slot for communications during a second portion of the slot.

In some examples of the method, apparatus, and non-transitory computer-readable medium described above, the communications during the mini-slot may be for the receiving device or for a different receiving device.

In some examples of the method, apparatus, and non-transitory computer-readable medium described above, the mini-slot may have an associated duration that may be substantially the same as a duration for the second portion of the slot.

Some examples of the method, apparatus, and non-transitory computer-readable medium described above may further include processes, features, means, or instructions for multiplexing the mini-slot and the communications transmitted during the first portion of the slot, wherein the multiplexing comprises time division multiplexing.

In some examples of the method, apparatus, and non-transitory computer-readable medium described above, the first portion of the slot precedes in time the second portion of the slot.

In some examples of the method, apparatus, and non-transitory computer-readable medium described above, the second portion of the slot precedes in time the first portion of the slot.

Some examples of the method, apparatus, and non-transitory computer-readable medium described above may further include processes, features, means, or instructions for receiving, based at least in part on the HARQ scheme, a HARQ feedback message from the receiving device during a second portion of the slot.

Some examples of the method, apparatus, and non-transitory computer-readable medium described above may further include processes, features, means, or instructions for determining that the slot may be configured according to a TDD communications protocol, wherein a second portion of the slot may be selected based at least in part on the TDD communications protocol.

Some examples of the method, apparatus, and non-transitory computer-readable medium described above may further include processes, features, means, or instructions for receiving, during the first portion of the slot, communications from the receiving device. Some examples of the method, apparatus, and non-transitory computer-readable medium described above may further include processes, features, means, or instructions for transmitting, according to the HARQ scheme, a HARQ message to the receiving device during a second portion of the slot, the HARQ message transmitted based at least in part on the received communications.

In some examples of the method, apparatus, and non-transitory computer-readable medium described above, the HARQ scheme comprises communicating a HARQ feedback message during the slot.

In some examples of the method, apparatus, and non-transitory computer-readable medium described above, the HARQ scheme comprises communicating a HARQ feedback message during a slot that occurs subsequent in time to the slot.

Some examples of the method, apparatus, and non-transitory computer-readable medium described above may further include processes, features, means, or instructions for determining that a data transmission in a previous slot was transmitted for a full duration of the previous slot. Some examples of the method, apparatus, and non-transitory computer-readable medium described above may further include processes, features, means, or instructions for delaying, based at least in part on the HARQ scheme, transmission of a control channel during the slot.

Some examples of the method, apparatus, and non-transitory computer-readable medium described above may further include processes, features, means, or instructions for transmitting a grant message during the first portion of the slot.

In some examples of the method, apparatus, and non-transitory computer-readable medium described above, the communications with the receiving device comprise uplink communications.

In some examples of the method, apparatus, and non-transitory computer-readable medium described above, the communications with the receiving device comprise downlink communications.

Some examples of the method, apparatus, and non-transitory computer-readable medium described above may further include processes, features, means, or instructions for receiving a signal indicating a pool of available HARQ schemes, wherein the selected HARQ scheme is from the pool of available HARQ schemes. In some examples of the method, apparatus, and non-transitory computer-readable medium described above, the signal comprises a radio resource control signal.

DETAILED DESCRIPTION

Aspects of the disclosure are initially described in the context of a wireless communications system. Generally, aspects of the disclosure provide for use of FDD framing in a TDD configured wireless communication system that supports a HARQ timeline with improved latency and performance. For example, a transmitting device (e.g., a UE and/or a base station) may use shortened transmission timelines in uplink and/or downlink communications for time alignment of the TDD configured system. The transmitting device may be configured for communications in a TDD configured wireless communication system. The TDD configured wireless communication system may use slot(s) for wireless communications where the slot(s) have a predetermined duration (e.g., according to the TDD configuration). The transmitting device may transmit information during a portion of the slot, but refrain from communicating during a second portion of the slot. The transmitting device may adopt a HARQ scheme that supports HARQ feedback during the slot, in some instances, or in the next slot, in other instances. In some aspects, the transmitting device may adopt the HARQ scheme from a configured pool of available HARQ schemes. In some aspects, the transmitting device may use the unused portion of the slot (e.g., the second portion where the transmitting device is not transmitting) to multiplex mini-slots. The mini-slots may be used or otherwise allocated for communications with the receiving device (e.g., the device receiving the communications during the first portion of the slot) and/or for other receiving device(s).

Aspects of the disclosure are further illustrated by and described with reference to apparatus diagrams, system diagrams, and flowcharts that relate to FDD HARQ with mini-slots.

Figure 1:
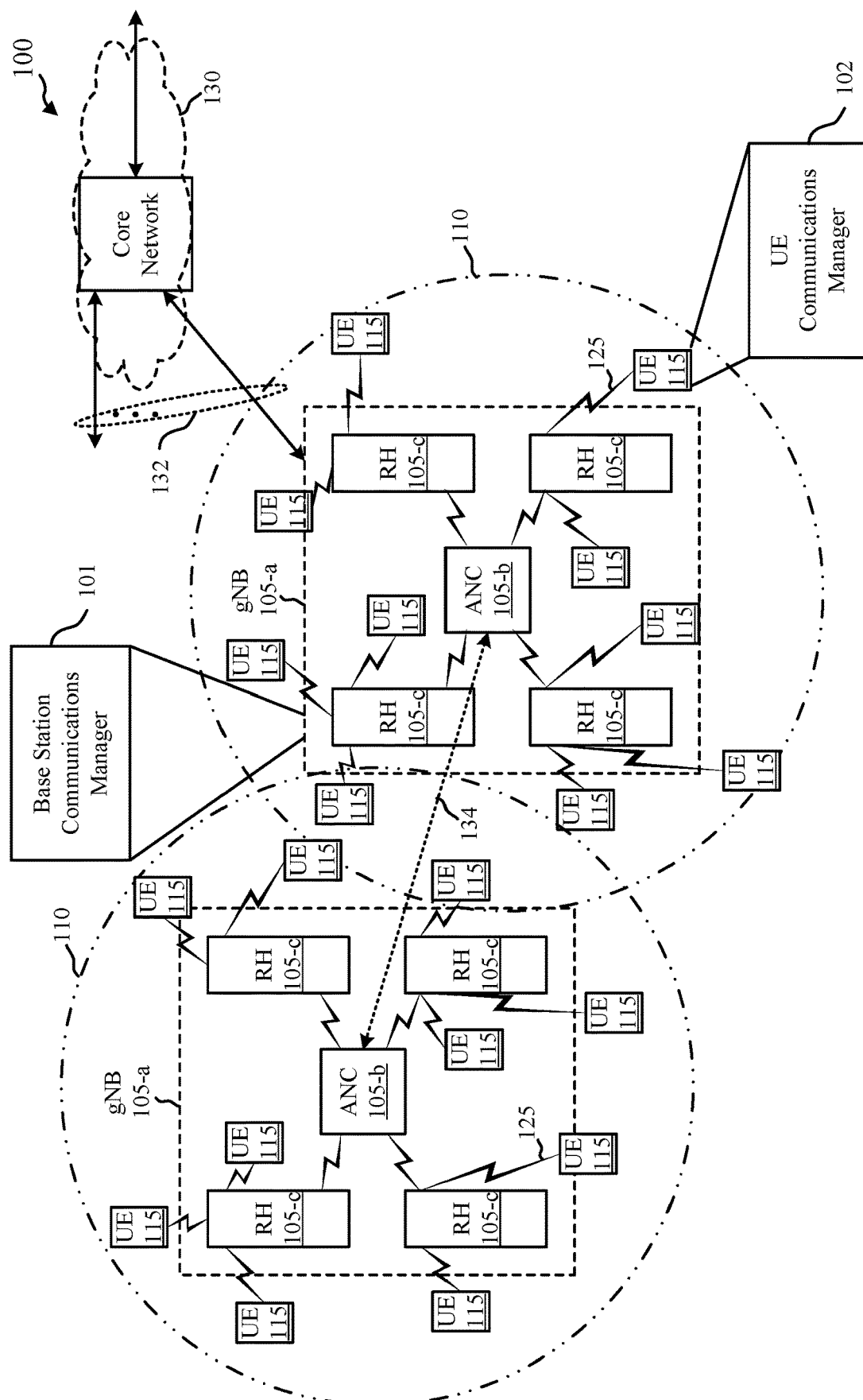
FIG. 1 illustrates an example of a system for wireless communication that supports FDD HARQ with mini-slots, in accordance with one or more aspects of the present disclosure.

FIG. 1 illustrates an example of a wireless communication system 100, in accordance with one or more aspects of the present disclosure. The wireless communication system 100 includes base stations 105 (e.g., gNodeBs (gNBs) 105-*a* including an access node controller 105-*b*, and/or radio heads (RHs) 105-*c*), UEs 115, and a core network 130. In some examples, the wireless communication system 100 may be a LTE, LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may perform radio configuration and scheduling for communication with UEs 115, or may operate under the control of a base station controller (not shown). In some examples, base stations 105 may be macro cells, small cells, hot spots, or the like.

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

Wireless communication system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or PDCP layer may be IP-based. A RLC layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a network device 105-c, network device 105-b, or core network 130 supporting radio bearers for user plane data. At the physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link).

An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

In some aspects, references to a transmitting device generally refers to any device that is transmitting information to another device. The transmitting device may be a UE 115 transmitting information to a base station 105 and/or another UE 115 or may be a base station 105 transmitting information to another base station 105 and/or a UE 115. Also, references to a receiving device generally refers to any device receiving information from another device. The receiving device may be a UE 115 receiving information from a base station 105 and/or another UE 115 or may be a base station 105 receiving information to another base station 105 and/or a UE 115.

In some aspect, a base station 105 may include a base station communications manager 101 and a UE 115 may include a UE communications manager 102. The base station communications manager 101 and/or the UE communications manager 102 may be configured similarly when the corresponding device is configured as a transmitting device. The base station communications manager 101 and/or the UE communications manager 102 may identify a duration of a slot used for communications with a receiving device. The base station communications manager 101 and/or the UE communications manager 102 may determine that the communications with the receiving device include FDD communications. The base station communications manager 101 and/or the UE communications manager 102 may transmit communications to the receiving device during a first portion of the slot. The duration of the first portion may be less than the duration of the slot. The duration of the first portion may be based on the determination that the communications are FDD communications. The base station communications manager 101 and/or the UE communications manager 102 may determine, based on the determination that the communications are FDD communications and that the communications are transmitted during the first portion of the slot, a HARQ scheme to use during the communications.

Figure 2:
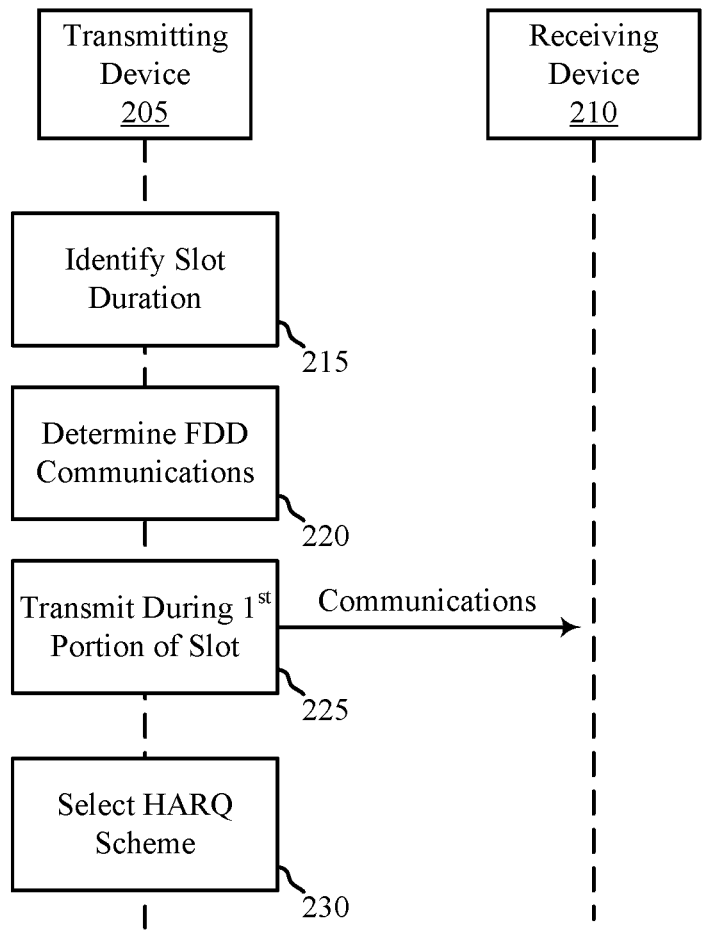
FIG. 2 illustrates an example of a process that supports FDD HARQ with mini-slots, in accordance with one or more aspects of the present disclosure.

FIG. 2 illustrates an example of a process 200 that supports FDD HARQ with mini-slots, in accordance with one or more aspects of the present disclosure. In some examples, process 200 may implement aspects of wireless communication system 100. Process 200 may include a transmitting device 205 and a receiving device 210, which may be examples of the corresponding devices described herein. Generally, process 200 illustrates one example of shortened data transmission to match the timeline in a TDD configured wireless communication system.

At 215, transmitting device 205 may identify a slot duration. The duration of the slot may be based on the timeline of the TDD configured wireless communication system. As discussed above, the slot may include simultaneous downlink communications on one slot using a first set of subbands and uplink communications during the slot (e.g., time aligned) using a second set of subbands.

At 220, transmitting device 205 may determine that the communications with the receiving device 210 include FDD communications. For example, FDD communications may include the time aligned uplink and downlink slots where the devices may use the uplink slot to communicate HARQ information associated with the downlink slot, and vice versa. Thus, the TDD configured wireless communication system may use a downlink slot that uses FDD with respect to a time aligned uplink slot.

At 225, transmitting device 205 may transmit communications to the receiving device 210 during a first portion of the slot. The first portion of the slot may have a duration that is less than the slot duration. The duration of the first portion of the slot may be selected based at least in part on the communications being FDD communications.

In some aspects, communicating in the first portion of the slot may provide for shortened communications. For example, transmitting device 205 may determine that HARQ reporting includes feedback information in the slot (e.g., a second portion of the slot). Thus, in some examples of downlink communications the first portion of the slot may be the portion used for shortened communications and the second portion of the slot may be unused and/or used as a mini-slot. In some examples of uplink communications the first portion of the slot may be the shortened uplink communications and the second portion of the slot (which may precede the first portion in time) may be unused and/or used for a mini-slot. Thus, in a downlink scenario the second portion may follow in time the first portion of the slot. In an uplink scenario, the first portion may follow in time the second portion of the slot. In some aspects, the data shortening in the downlink scenario may be due to the distance between the downlink data transmission in the first portion of the slot and the HARQ feedback (e.g., ACK/NACK) from the receiving device 210 in the second portion of the slot. In some aspects, uplink data shortening may be due to the distance between the uplink grant (transmitted in the downlink control) in the second portion of the slot and the uplink data transmitted during the first portion of the slot.

In some aspects, transmitting device 205 may select the duration for the second portion of the slot based on receiving HARQ feedback during the slot. Accordingly, transmitting device 205 may receive the HARQ feedback from receiving device 210 during the second portion of the slot (not shown). In some aspects, transmitting device 205 may select the duration for the second portion of the slot based on receiving HARQ feedback in the next slot, e.g., the slot following the slot in time.

In some aspects, the duration of the second portion may be based on the TDD configuration of the wireless communication system. As discussed, the FDD uplink and downlink slots may be time aligned such that the duration of the second portion of the slot may be selected to support receiving the HARQ feedback in the same slot (e.g., to provide sufficient time for receiving device 210 to receive the transmissions and transmit the HARQ feedback in the slot).

At 230, transmitting device 205 may select a HARQ scheme to use during the communications with receiving device 210. The HARQ scheme may be selected based, at least in certain aspects, on the determination that the communications are FDD communications and/or that the communications were during the first portion of the slot. The HARQ scheme may include communicating HARQ feedback information (e.g., messages) in the same slot and/or in the next slot, e.g., a full data transmission in the slot and delaying the control information transmission. In some aspects, transmitting device 205 may be configured with a pool of available HARQ schemes, e.g., via RRC signaling. The transmitting device 205 may identify or otherwise adopt a HARQ scheme from the pool of available HARQ schemes.

Figure 3:
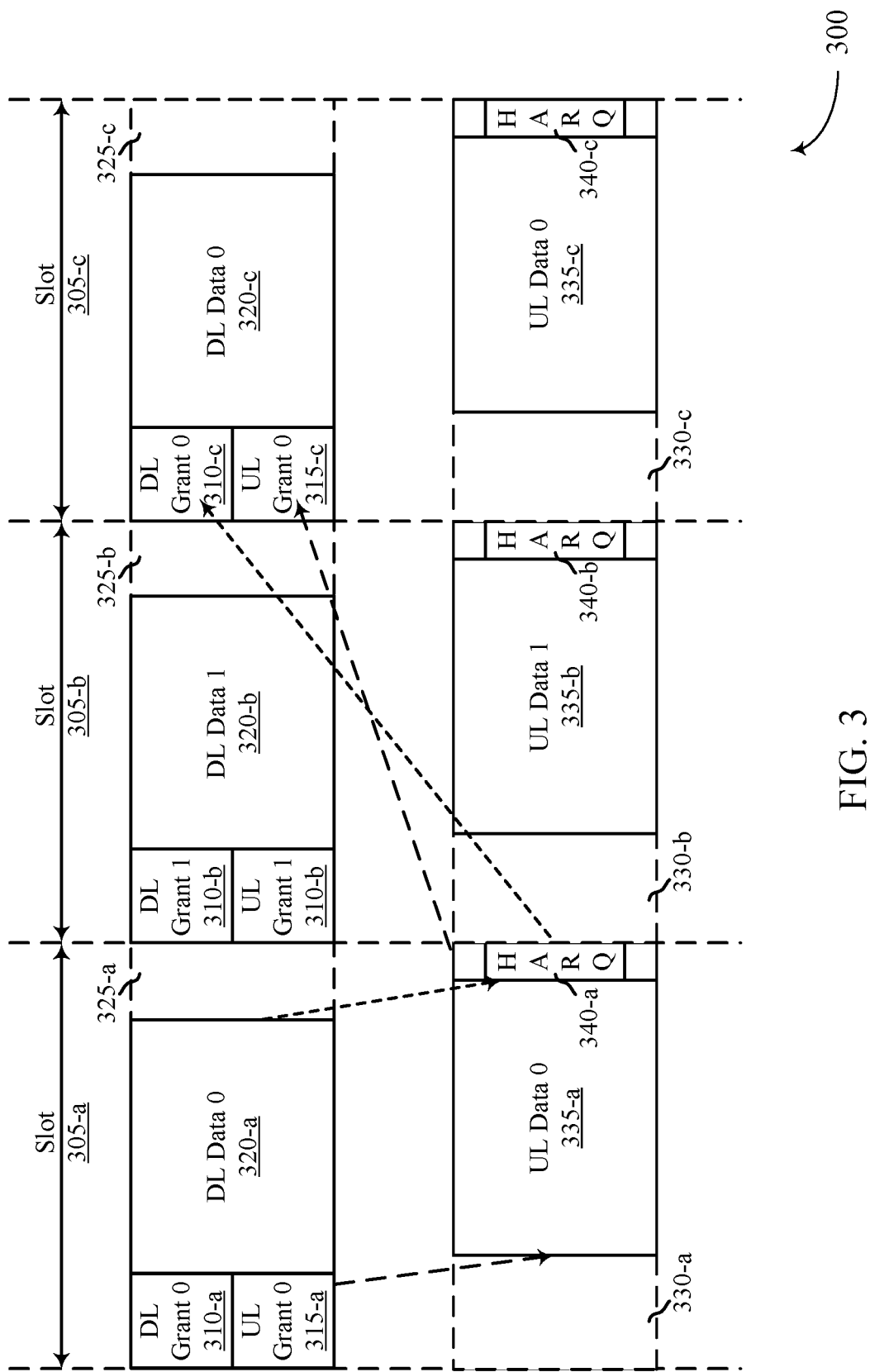
FIG. 3 illustrates an example of a slot configuration that supports FDD HARQ with mini-slots, in accordance with one or more aspects of the present disclosure.

FIG. 3 illustrates an example of a slot configuration 300 that supports FDD HARQ with mini-slots, in accordance with one or more aspects of the present disclosure. In some examples, slot configuration 300 may implement aspects of wireless communication system 100 and/or process 200. Slot configuration 300 illustrates one example of shortened data transmission in a slot to support HARQ feedback in the slot. In some aspects, slot configuration 300 may support two downlink HARQ and two uplink HARQ processes.

Generally, slot configuration 300 may include three slots 305, illustrated as slots 305-*a*, 305-*b*, and 305-*c*. During each slot 305, there may be downlink communications on a first set of subbands and uplink communications on a second set of subbands. The downlink communications and the uplink communications in the slot 305 may be time aligned (as indicated by the dashed vertical lines). In some aspects, downlink communications in a slot 305 may include a downlink grant 310, an uplink grant 315, downlink data 320, and an unused period 325. In a downlink communications scenario, the second portion of the slot 305 may include the unused period 325 and the first portion of the slot may include the downlink data 320. In some examples of the downlink communication scenario, the first portion of the slot may also include the downlink grant 310 and/or the uplink grant 315. Thus, the first portion of the downlink slot 305 may precede in time the second portion of the slot 305.

In some aspects, uplink communications in a slot 305 may include an unused period 330, uplink data 335, and HARQ 340. In an uplink communications scenario, the second portion of the slot 305 may include the unused period 330 and the first portion of the slot may include the uplink data 335. In some examples of the uplink communication scenario, the first portion of the slot may also include the HARQ 340. Thus, the second portion of the uplink slot 305 may precede in time the first portion of the slot 305.

Generally, slot configuration 300 illustrates one example of transmission shortening to support a HARQ scheme that provides HARQ feedback in the slot 305. As one example for downlink communications, a transmitting device may transmit information to a receiving device during downlink data 320 (illustrated by the dashed line from downlink data 320-*a* to HARQ 340-*a*). Transmission of the downlink data 320, however, may be shortened such that the first portion of the slot 305 (e.g., in the downlink scenario) may have a duration that is less than the duration of the slot 305. Accordingly, the receiving device may receive the shortened data transmission during the first portion of the downlink slot and provide HARQ feedback (e.g., HARQ 340) during the slot 305. Moreover, based on the HARQ feedback received during the slot 305, the transmitting device may determine whether to retransmit the downlink data again and, if so, communicate another downlink grant in a subsequent slot (illustrated by the dashed line from HARQ 340-*a* to downlink grant 310-*c* in slot 305-*c*).

As an example for uplink communications, a transmitting device may receive an uplink grant 315 that is transmitted during the downlink control period of the downlink slot (illustrated by the dashed line from uplink grant 315-*a* to the uplink data 335-*a*). The transmitting device may then transmit the uplink data 335 to the receiving device during the slot 305. Based on HARQ information received from the receiving device, the transmitting device may retransmit the uplink data, if needed, during a subsequent slot (illustrated by the dashed line from uplink data 335-*a* to uplink grant 315-*c*).

Figure 4:
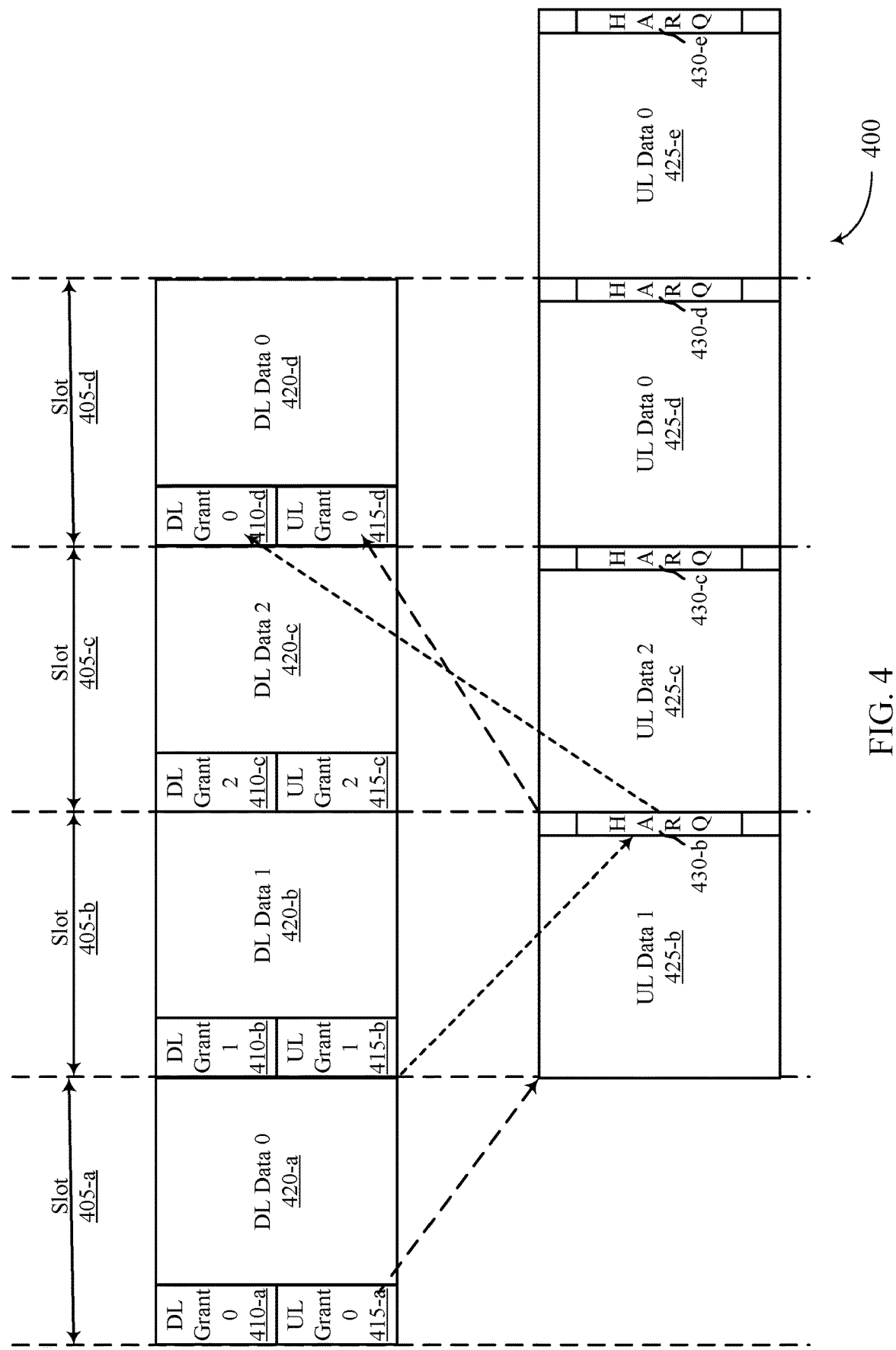
FIG. 4 illustrates an example of a slot configuration that supports FDD HARQ with mini-slots, in accordance with one or more aspects of the present disclosure.

FIG. 4 illustrates an example of a slot 400 that supports FDD HARQ with mini-slots, in accordance with one or more aspects of the present disclosure. In some examples, slot configuration 400 may implement aspects of wireless communication system 100 and/or process 200. Slot configuration 400 illustrates one example of support for three downlink HARQ and three uplink HARQ processes in a short physical uplink control channel (PUCCH) configuration.

Generally, slot configuration 400 may include four slots 405, illustrated as slots 405-*a*, 405-*b*, 405-*c*, and 405-*d*. During each slot 405, there may be downlink communications on a first set of subbands and uplink communications on a second set of subbands. The downlink communications and the uplink communications in the slot 405 may be time aligned (as indicated by the dashed vertical lines). In some aspects, downlink communications in a slot 405 may include a downlink grant 410, an uplink grant 415, and downlink data 420. In some aspects, uplink communications in a slot 405 may include an uplink data 425 and HARQ 430.

Generally, slot configuration 400 illustrates one example of a HARQ scheme that provides HARQ feedback in a subsequent slot 405. As one example for downlink communications, a transmitting device may transmit information to a receiving device during downlink data 420 (illustrated by the dashed line from downlink data 420-*a* to HARQ 430-*b*). Accordingly, the receiving device may receive the data transmission during the downlink slot 405-*a* and provide HARQ feedback (e.g., HARQ 430-*b*) during the slot 405-*b*. Moreover, based on the HARQ feedback received during the slot 405-*b*, the transmitting device may determine whether to retransmit the downlink data again and, if so, communicate another downlink grant in a subsequent slot (illustrated by the dashed line from HARQ 430-*b* to downlink grant 410-*d* in slot 405-*d*).

As an example for uplink communications, a transmitting device may receive an uplink grant 415-*a* that is transmitted during the downlink control period of the downlink slot 405-*a* (illustrated by the dashed line from uplink grant 415-*a* to the uplink data 425-*b*). The transmitting device may then transmit the uplink data 425-*b* to the receiving device during the slot 405-*b*. Based on HARQ information received from the receiving device, the transmitting device may retransmit the uplink data, if needed, during a subsequent slot (illustrated by the dashed line from uplink data 425-*b* to uplink grant 415-*d*).

Figure 5:
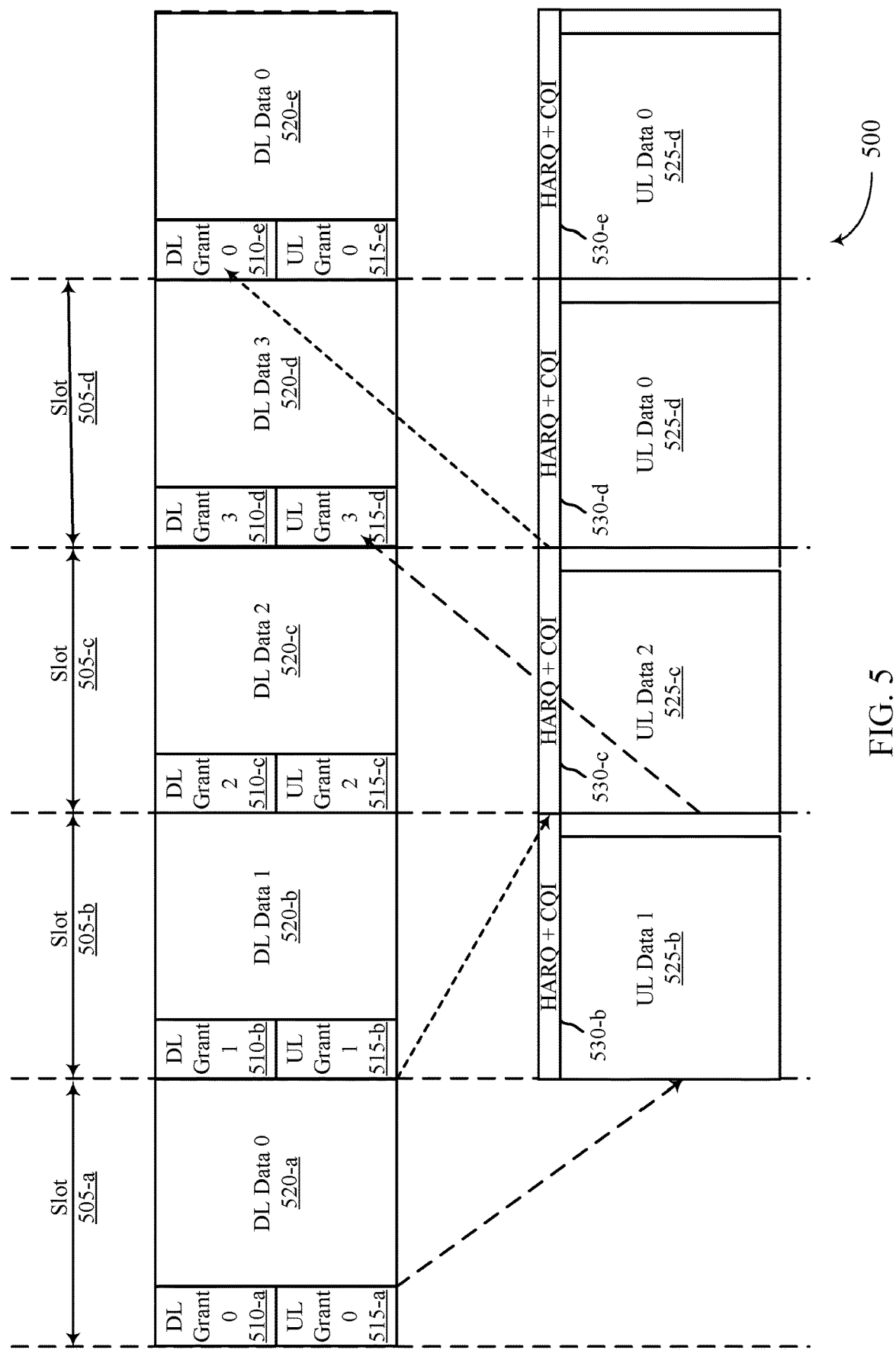
FIG. 5 illustrates an example of a slot configuration that supports FDD HARQ with mini-slots, in accordance with one or more aspects of the present disclosure.

FIG. 5 illustrates an example of a slot configuration 500 that supports FDD HARQ with mini-slots, in accordance with one or more aspects of the present disclosure. In some examples, slot configuration 500 may implement aspects of wireless communication system 100 and/or process 200. Slot configuration 500 illustrates one example of support for four downlink HARQ and three uplink HARQ processes in a long PUCCH configuration.

Generally, slot configuration 500 may include four slots 505, illustrated as slots 505-*a*, 505-*b*, 505-*c*, and 505-*d*. For discussion purposes only, a fifth slot 505-*e* is also shown. During each slot 505, there may be downlink communications on a first set of subbands and uplink communications on a second set of subbands. The downlink communications and the uplink communications in the slot 505 may be time aligned (as indicated by the dashed vertical lines). In some aspects, downlink communications in a slot 505 may include a downlink grant 510, an uplink grant 515, and downlink data 520. In some aspects, uplink communications in a slot 505 may include an uplink data 525 and HARQ 530.

Generally, slot configuration 500 illustrates one example of a HARQ scheme that provides HARQ feedback in a subsequent slot 505. As one example for downlink communications, a transmitting device may transmit information to a receiving device during downlink data 520 (illustrated by the dashed line from downlink data 520-*a* to HARQ 530-*b*). Accordingly, the receiving device may receive the data transmission during the downlink slot 505-*a* and provide HARQ feedback (e.g., HARQ 530-*b*) during the slot 505-*b*. Moreover, based on the HARQ feedback received during the slot 505-*b*, the transmitting device may determine whether to retransmit the downlink data again and, if so, communicate another downlink grant in a subsequent slot (illustrated by the dashed line from HARQ 530-*c* to downlink grant 510-*e* in slot 505-*e*).

As an example for uplink communications, a transmitting device may receive an uplink grant 515-*a* that is transmitted during the downlink control period of the downlink slot 505-*a* (illustrated by the dashed line from uplink grant 515-*a* to the uplink data 525-*b*). The transmitting device may then transmit the uplink data 525-*b* to the receiving device during the slot 505-*b*. Based on HARQ information received from the receiving device, the transmitting device may retransmit the uplink data, if needed, during a subsequent slot (illustrated by the dashed line from uplink data 525-*b* to uplink grant 515-*d*).

Figure 6:
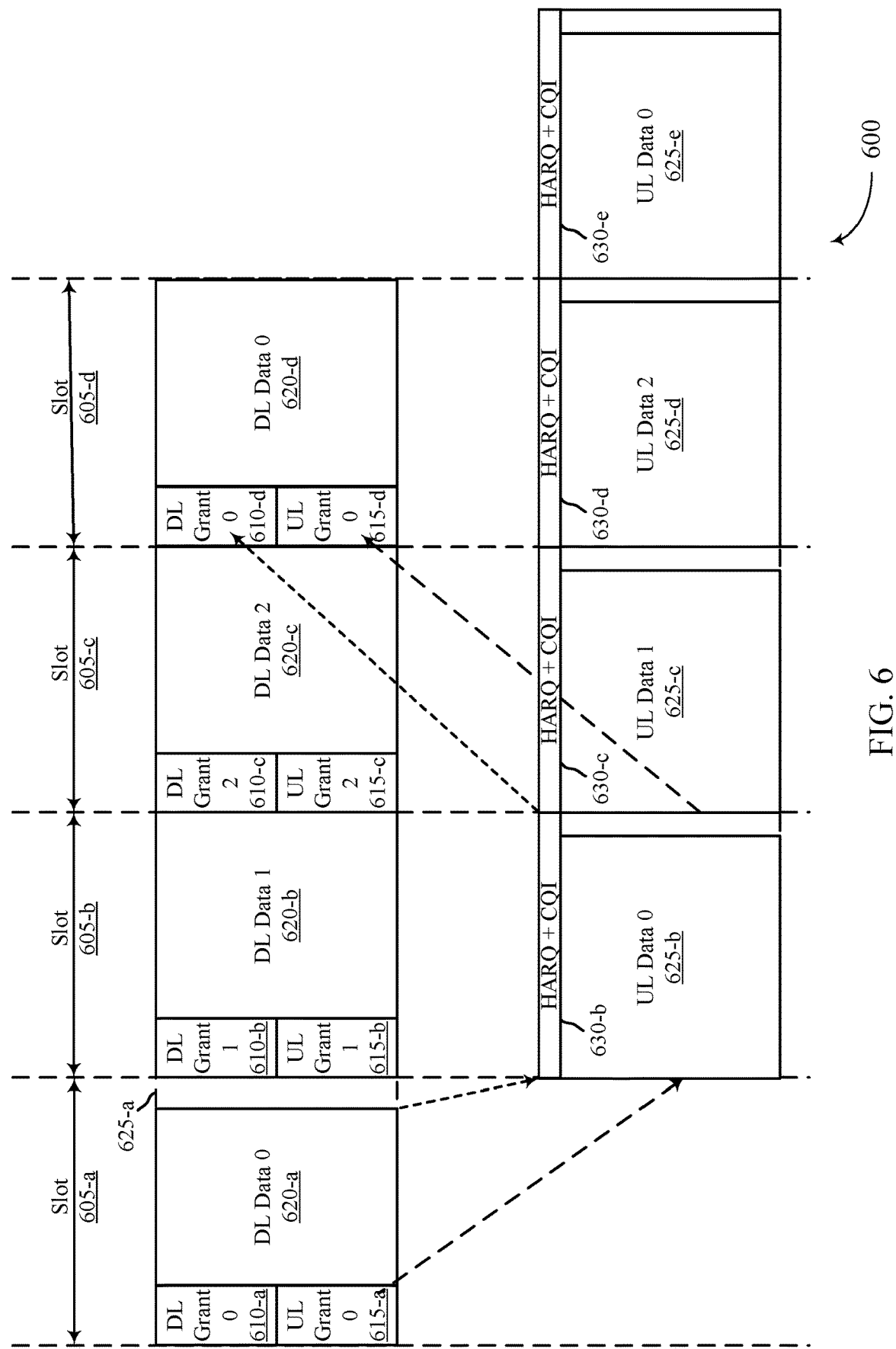
FIG. 6 illustrates an example of a slot configuration that supports FDD HARQ with mini-slots, in accordance with one or more aspects of the present disclosure.

FIG. 6 illustrates an example of a slot configuration 600 that supports FDD HARQ with mini-slots, in accordance with one or more aspects of the present disclosure. In some examples, slot configuration 600 may implement aspects of wireless communication system 100 and/or process 200. Slot configuration 600 illustrates one example of shortened data transmission in a slot to support HARQ feedback a next slot. In some aspects, slot configuration 600 may support three downlink HARQ and three uplink HARQ processes in a long PUCCH configuration.

Generally, slot configuration 600 may include four slots 605, illustrated as slots 605-*a*, 605-*b*, 605-*c*, and 605-*d*. During each slot 605, there may be downlink communications on a first set of subbands and uplink communications on a second set of subbands. The downlink communications and the uplink communications in the slot 605 may be time aligned (as indicated by the dashed vertical lines). In some aspects, downlink communications in a slot 605 may include a downlink grant 610, an uplink grant 615, downlink data 620, and an unused period 625. In a downlink communications scenario, the second portion of the slot 605 may include the unused period 625 and the first portion of the slot may include the downlink data 620. In some examples of the downlink communication scenario, the first portion of the slot may also include the downlink grant 610 and/or the uplink grant 615. Thus, the first portion of the downlink slot 605 may precede in time the second portion of the slot 605.

In some aspects, uplink communications in a slot 605 may include uplink data 625 and HARQ 630. The HARQ 630 may also include channel quality indicator (CQI) information transmitted along with the HARQ feedback messages.

Generally, slot configuration 600 illustrates one example of transmission shortening to support a HARQ scheme that provides HARQ feedback in the next slot 605. As one example for downlink communications, a transmitting device may transmit information to a receiving device during downlink data 620 (illustrated by the dashed line from downlink data 620-*a* to HARQ 630-*b*). Transmission of the downlink data 620-*a*, however, may be shortened such that the first portion of the slot 605 (e.g., in the downlink scenario) may have a duration that is less than the duration of the slot 605. Accordingly, the receiving device may receive the shortened data transmission during the first portion of the downlink slot and provide HARQ feedback (e.g., HARQ 630-*b*) during the slot 605. Moreover, based on the HARQ feedback received during the slot 605-*b*, the transmitting device may determine whether to retransmit the downlink data again and, if so, communicate another downlink grant in a subsequent slot (illustrated by the dashed line from HARQ 630-*b* to downlink grant 610-*d* in slot 605-*d*).

As an example for uplink communications, a transmitting device may receive an uplink grant 615 that is transmitted during the downlink control period of the downlink slot (illustrated by the dashed line from uplink grant 615-*a* to the uplink data 625-*b*). The transmitting device may then transmit the uplink data 625-*b* to the receiving device during the slot 605-*b*. Based on HARQ information received from the receiving device, the transmitting device may retransmit the uplink data, if needed, during a subsequent slot (illustrated by the dashed line from uplink data 625-*b* to uplink grant 615-*d*).

Figure 7:
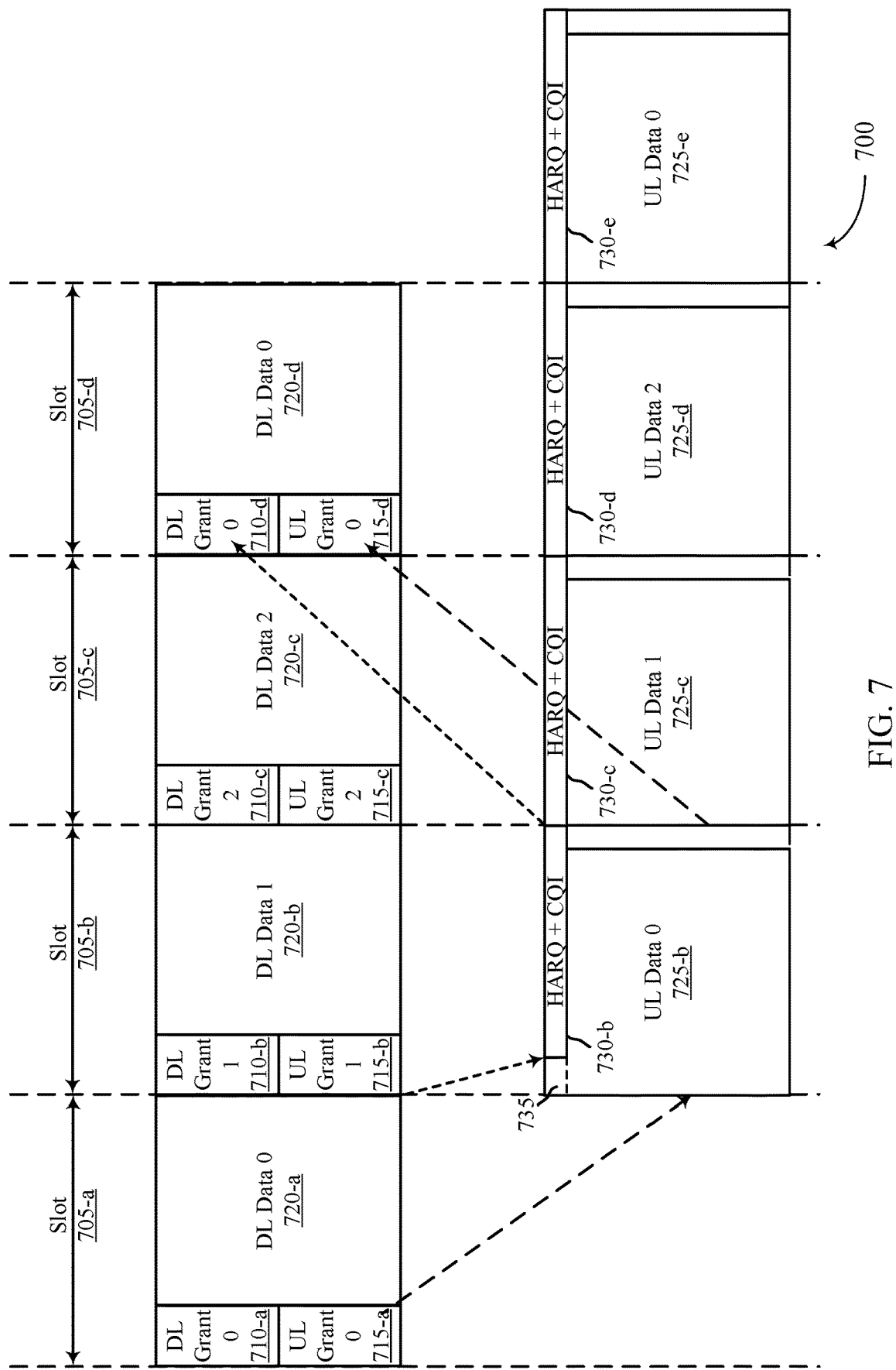
FIG. 7 illustrates an example of a slot configuration that supports FDD HARQ with mini-slots, in accordance with one or more aspects of the present disclosure.

FIG. 7 illustrates an example of a slot configuration 700 that supports FDD HARQ with mini-slots, in accordance with one or more aspects of the present disclosure. In some examples, slot configuration 700 may implement aspects of wireless communication system 100 and/or process 200. Slot configuration 700 illustrates one example of shortened control transmission in a slot to support HARQ feedback in a next slot. In some aspects, slot configuration 700 may support three downlink HARQ and three uplink HARQ processes in a long PUCCH configuration.

Generally, slot configuration 700 may include four slots 705, illustrated as slots 705-*a*, 705-*b*, 705-*c*, and 705-*d*. During each slot 705, there may be downlink communications on a first set of subbands and uplink communications on a second set of subbands. The downlink communications and the uplink communications in the slot 705 may be time aligned (as indicated by the dashed vertical lines). In some aspects, downlink communications in a slot 705 may include a downlink grant 710, an uplink grant 715, and downlink data 720.

In some aspects, uplink communications in a slot 705 may include uplink data 725, HARQ 730, and in some examples, unused period 735. The HARQ 730 may also include CQI information transmitted along with the HARQ feedback messages. In an uplink communications scenario, the second portion of the slot 705 may include the unused period 735 and the first portion of the slot may include the uplink data 735. In some examples of the uplink communication scenario, the first portion of the slot may also include the HARQ 730. Thus, the first portion of the uplink slot 705 may correspond in time with the second portion of the slot 705, e.g., may overlap.

Generally, slot configuration 700 illustrates one example of transmission shortening to support a HARQ scheme that provides HARQ feedback in the next slot 705. As one example for downlink communications, a transmitting device may transmit information to a receiving device during downlink data 720 (illustrated by the dashed line from downlink data 720-*a* to HARQ 730-*b*). Transmission of the downlink data 720-*a* may occupy the full duration of the slot 705 and may have a duration that is the same as the duration of the slot 705. Accordingly, the receiving device may receive the data transmission during the downlink slot and provide HARQ feedback (e.g., HARQ 730-*b*) during the slot 705. Moreover, based on the HARQ feedback received during the slot 705-*b*, the transmitting device may determine whether to retransmit the downlink data again and, if so, communicate another downlink grant in a subsequent slot (illustrated by the dashed line from HARQ 730-*b* to downlink grant 710-*d* in slot 705-*d*).

However, due to the downlink data 720-*a* occupying the full duration of the slot 705-*a*, the receiving device may delay transmission of the control information (e.g., HARQ 730-*b*. The delay created by delaying transmission of the control information may create unused period 735.

As an example for uplink communications, a transmitting device may receive an uplink grant 715 that is transmitted during the downlink control period of the downlink slot (illustrated by the dashed line from uplink grant 715-*a* to the uplink data 725-*b*). The transmitting device may then transmit the uplink data 725-*b* to the receiving device during the slot 705-*b*. Based on HARQ information received from the receiving device, the transmitting device may retransmit the uplink data, if needed, during a subsequent slot (illustrated by the dashed line from uplink data 725-*b* to uplink grant 715-*d*).

Figure 8:
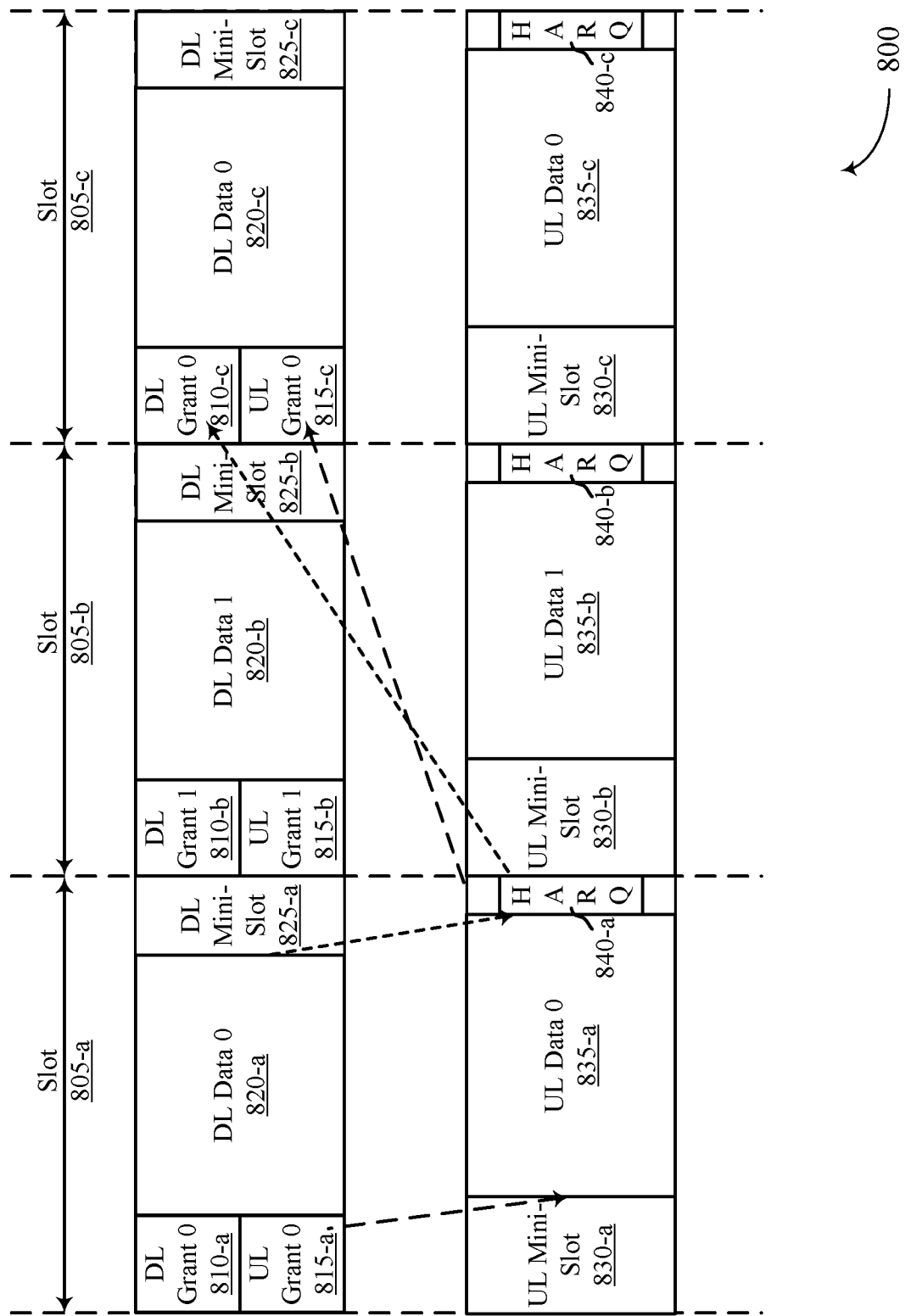
FIG. 8 illustrates an example of a slot configuration that supports FDD HARQ with mini-slots, in accordance with one or more aspects of the present disclosure.

FIG. 8 illustrates an example of a slot configuration 800 that supports FDD HARQ with mini-slots, in accordance with one or more aspects of the present disclosure. In some examples, slot configuration 800 may implement aspects of wireless communication system 100 and/or process 200. Slot configuration 800 illustrates one example of shortened data transmission in a slot to support HARQ feedback in the slot. In some aspects, slot configuration 800 may support two downlink HARQ and two uplink HARQ processes.

Generally, slot configuration 800 may include three slots 805, illustrated as slots 805-*a*, 805-*b*, and 805-*c*. During each slot 805, there may be downlink communications on a first set of subbands and uplink communications on a second set of subbands. The downlink communications and the uplink communications in the slot 805 may be time aligned (as indicated by the dashed vertical lines). In some aspects, downlink communications in a slot 805 may include a downlink grant 810, an uplink grant 815, downlink data 820, and a downlink mini-slot 825. In a downlink communications scenario, the second portion of the slot 805 may include the downlink mini-slot 825 and the first portion of the slot may include the downlink data 820. In some examples of the downlink communication scenario, the first portion of the slot may also include the downlink grant 810 and/or the uplink grant 815. Thus, the first portion of the downlink slot 805 may precede in time the second portion of the slot 805.

In some aspects, uplink communications in a slot 805 may include an uplink mini-slot 830, uplink data 835, and HARQ 840. In an uplink communications scenario, the second portion of the slot 805 may include the uplink mini-slot 830 and the first portion of the slot may include the uplink data 835. In some examples of the uplink communication scenario, the first portion of the slot may also include the HARQ 840. Thus, the second portion of the uplink slot 805 may precede in time the first portion of the slot 805.

Generally, slot configuration 800 illustrates one example of transmission shortening to support a HARQ scheme that provides HARQ feedback in the slot 805. As one example for downlink communications, a transmitting device may transmit information to a receiving device during downlink data 820 (illustrated by the dashed line from downlink data 820-*a* to HARQ 840-*a*). Transmission of the downlink data 820-*a*, however, may be shortened such that the first portion of the slot 805 (e.g., in the downlink scenario) may have a duration that is less than the duration of the slot 805. Accordingly, the receiving device may receive the shortened data transmission during the first portion of the downlink slot and provide HARQ feedback (e.g., HARQ 840) during the slot 805. Moreover, based on the HARQ feedback received during the slot 805, the transmitting device may determine whether to retransmit the downlink data again and, if so, communicate another downlink grant in a subsequent slot (illustrated by the dashed line from HARQ 840-*a* to downlink grant 810-*c* in slot 805-*c*).

The transmitting device may use the period created by the shortened transmission to multiplex mini-slots, e.g., downlink mini-slot 825. The mini-slots 825 may be multiplexed with information for the receiving device and/or other receiving devices.

As an example for uplink communications, a transmitting device may receive an uplink grant 815 that is transmitted during the downlink control period of the downlink slot (illustrated by the dashed line from uplink grant 815-*a* to the uplink data 835-*a*). The transmitting device may then transmit the uplink data 835 to the receiving device during the slot 805. Based on HARQ information received from the receiving device, the transmitting device may retransmit the uplink data, if needed, during a subsequent slot (illustrated by the dashed line from uplink data 835-*a* to uplink grant 815-*c*).

The transmitting device may also use the period created by the transmission of the grant information to multiplex mini-slots, e.g., uplink mini-slot 830. The uplink mini-slots 830 may be multiplexed with information for the receiving device and/or other receiving devices.

Figure 9:
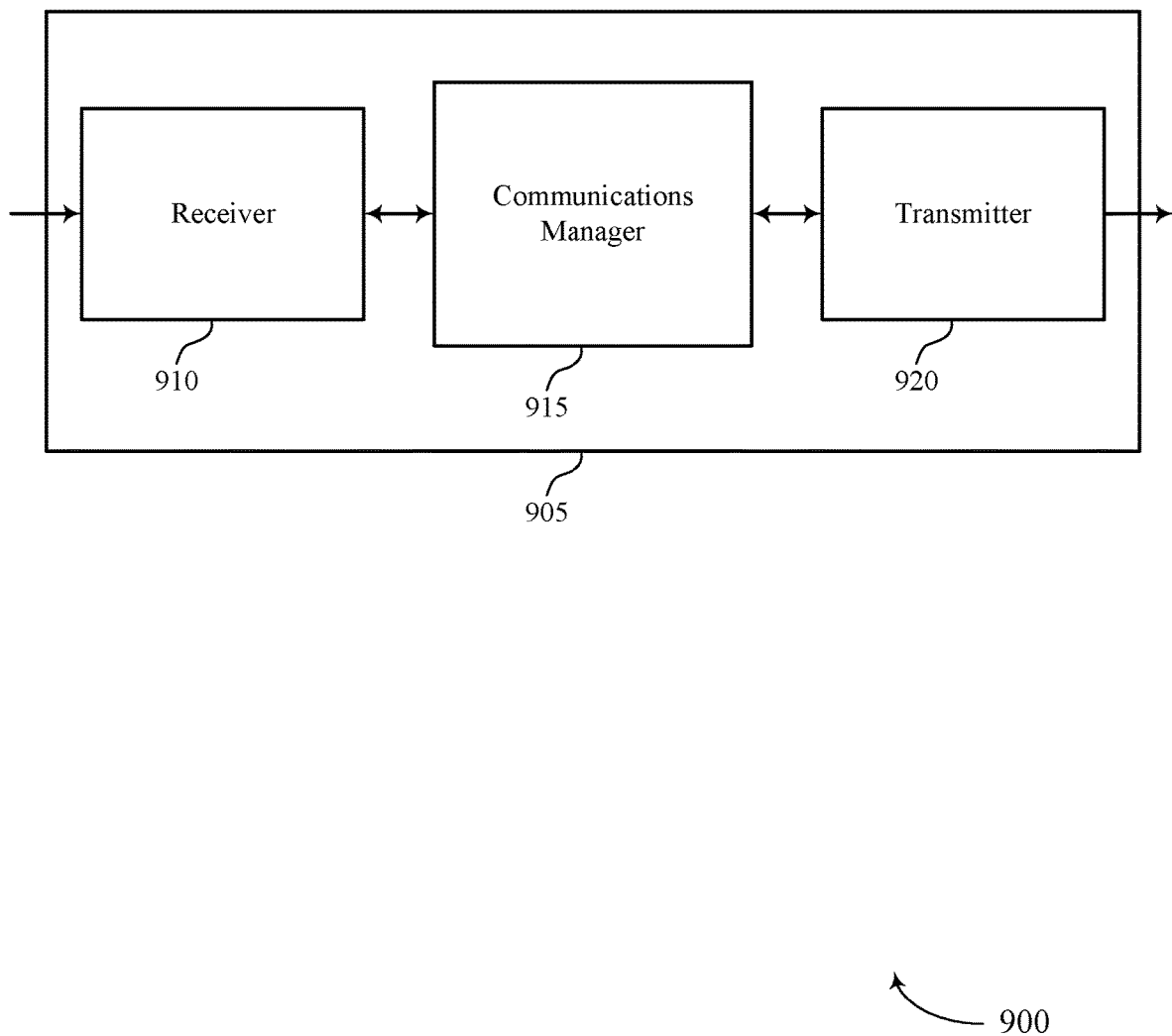
FIGS. 9 through 11 show block diagrams of a device that supports FDD HARQ with mini-slots, in accordance with one or more aspects of the present disclosure.

FIG. 9 shows a block diagram 900 of a wireless device 905 that supports FDD HARQ with mini-slots, in accordance with one or more aspects of the present disclosure. Wireless device 905 may be an example of aspects of a UE 115 or base station 105 as described herein, e.g., a transmitting device. Wireless device 905 may include receiver 910, communications manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to FDD HARQ with mini-slots, etc.). Information may be passed on to other components of the device. The receiver 910 may be an example of aspects of the transceiver 1235 described with reference to FIG. 12. The receiver 910 may utilize a single antenna or a set of antennas.

Communications manager 915 may be an example of aspects of the communications manager 1215 described with reference to FIG. 12.

Communications manager 915 and/or at least some of its various sub-components may be implemented in hardware, software executed by a processor, firmware, or any combination thereof. If implemented in software executed by a processor, the functions of the communications manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The communications manager 915 and/or at least some of its various sub-components may be physically located at various positions, including being distributed such that portions of functions are implemented at different physical locations by one or more physical devices. In some examples, communications manager 915 and/or at least some of its various sub-components may be a separate and distinct component in accordance with various aspects of the present disclosure. In other examples, communications manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Communications manager 915 may identify a duration of a slot used for communications with a receiving device. Communications manager 915 may determine that the communications with the receiving device includes FDD communications. Communications manager 915 may transmit communications to the receiving device during a first portion of the slot, a duration of the first portion being less than the duration of the slot and the duration of the first portion is based on the determination that the communications include FDD communications. Communications manager 915 may select, based on the determination that the communications include FDD communications and that the communications are transmitted during the first portion of the slot, a HARQ scheme to use during the communications.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may utilize a single antenna or a set of antennas.

Figure 10:
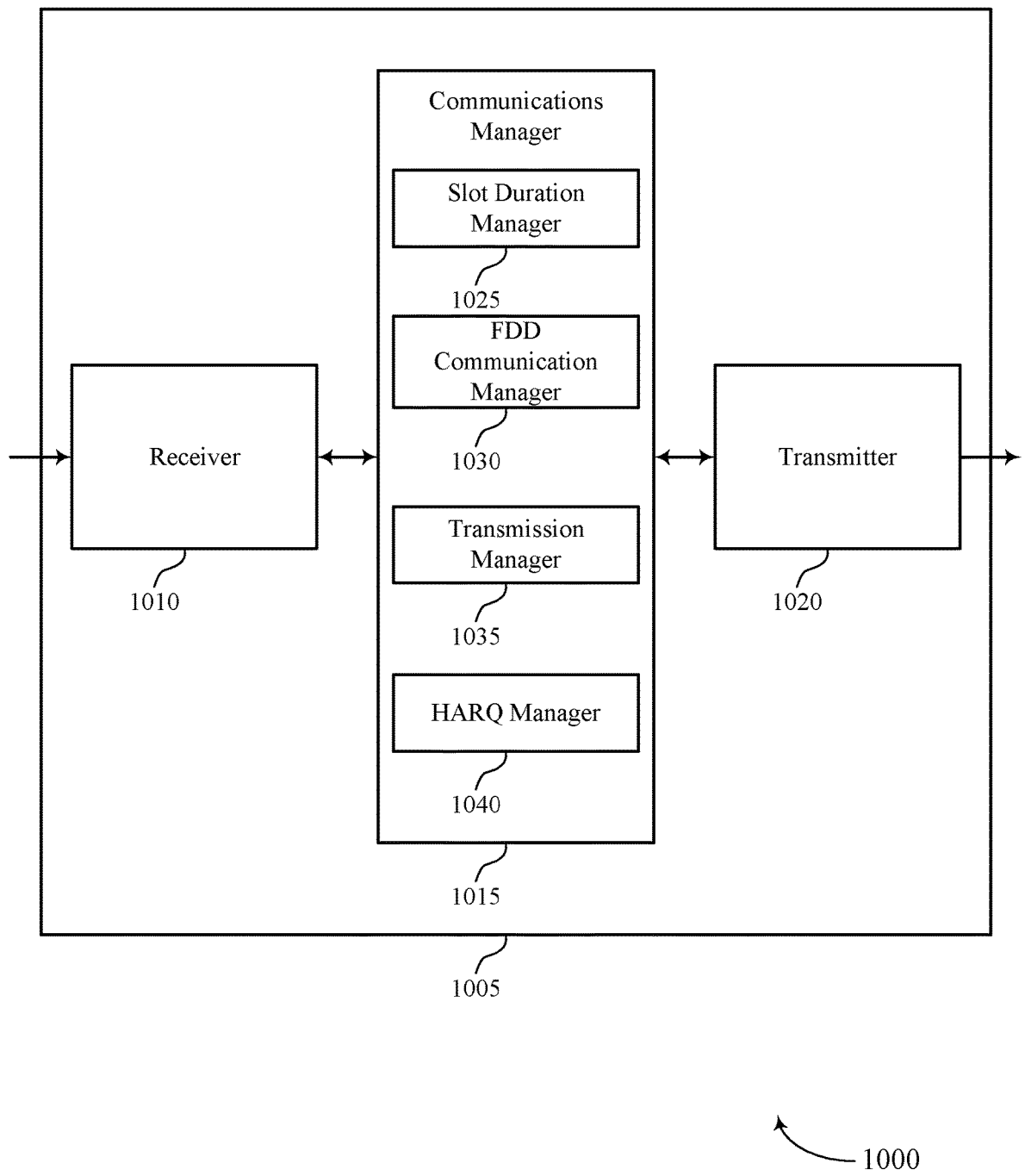

FIG. 10 shows a block diagram 1000 of a wireless device 1005 that supports FDD HARQ with mini-slots, in accordance with one or more aspects of the present disclosure. Wireless device 1005 may be an example of aspects of a wireless device 905 or a UE 115 or base station 105 as described herein, e.g., a transmitting device. Wireless device 1005 may include receiver 1010, communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to FDD HARQ with mini-slots, etc.). Information may be passed on to other components of the device. The receiver 1010 may be an example of aspects of the transceiver 1235 described with reference to FIG. 12. The receiver 1010 may utilize a single antenna or a set of antennas.

Communications manager 1015 may be an example of aspects of the communications manager 1215 described with reference to FIG. 12. Communications manager 1015 may also include slot duration manager 1025, FDD communication manager 1030, transmission manager 1035, and HARQ manager 1040.

Slot duration manager 1025 may identify a duration of a slot used for communications with a receiving device. FDD communication manager 1030 may determine that the communications with the receiving device includes FDD communications.

Transmission manager 1035 may transmit communications to the receiving device during a first portion of the slot, a duration of the first portion being less than the duration of the slot and the duration of the first portion is based on the determination that the communications include FDD communications. Transmission manager 1035 may select a duration for a second portion of the slot based on receiving a HARQ feedback message during the second portion of the slot. Transmission manager 1035 may transmit, according to the HARQ scheme, a HARQ message to the receiving device during a second portion of the slot, the HARQ message transmitted based on the received communications. In some cases, the communications with the receiving device include uplink communications. In some cases, the communications with the receiving device include downlink communications.

HARQ manager 1040 may select, based on the determination that the communications include FDD communications and that the communications are transmitted during the first portion of the slot, a HARQ scheme to use during the communications. HARQ manager 1040 may receive, based on the HARQ scheme, a HARQ feedback message from the receiving device during a second portion of the slot. In some cases, the HARQ scheme includes communicating a HARQ feedback message during the slot. In some cases, the HARQ scheme includes communicating a HARQ feedback message during a slot that occurs subsequent in time to the slot.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
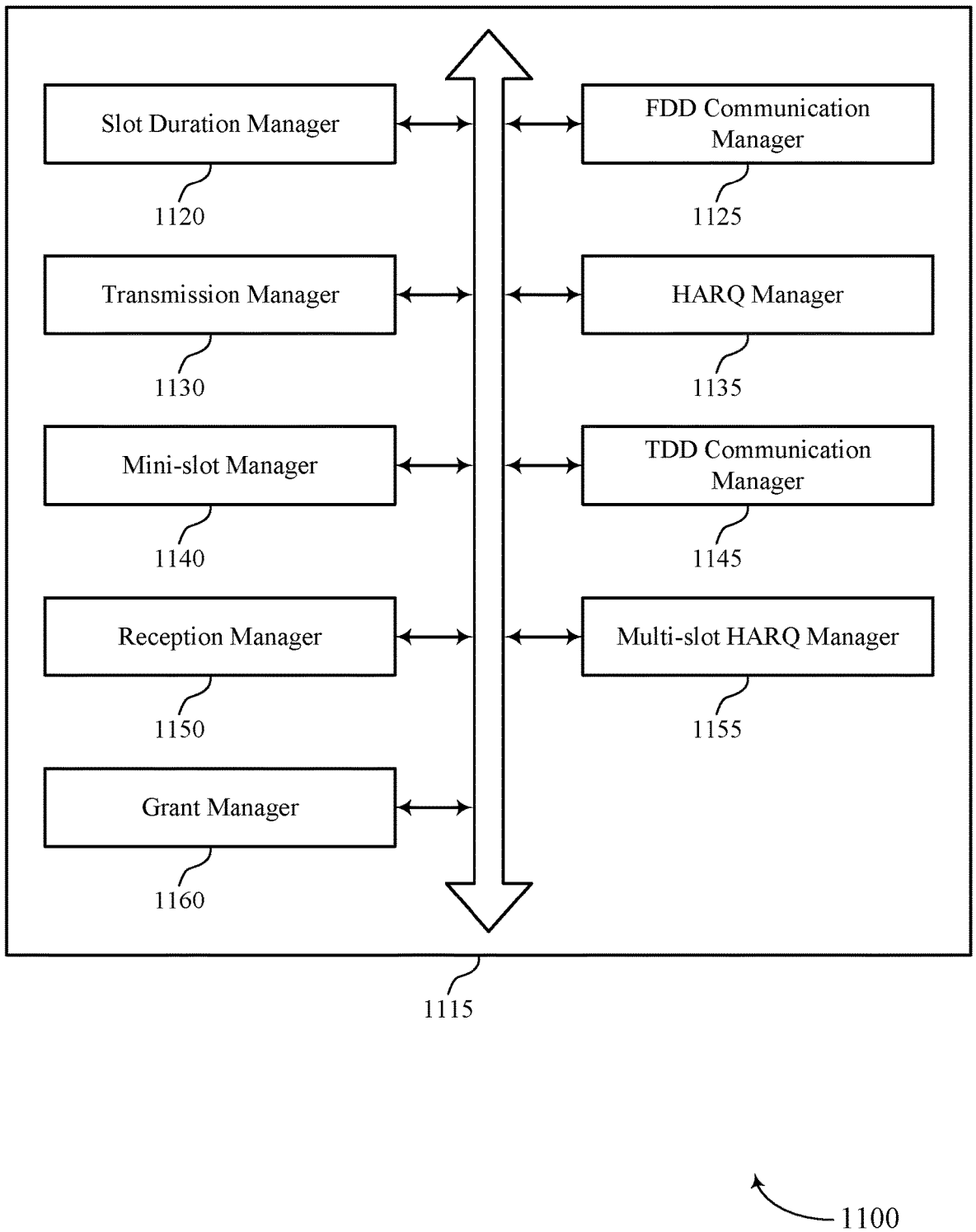

FIG. 11 shows a block diagram 1100 of a communications manager 1115 that supports FDD HARQ with mini-slots, in accordance with one or more aspects of the present disclosure. The communications manager 1115 may be an example of aspects of a communications manager 915, a communications manager 1015, or a communications manager 1215 described with reference to FIGS. 9, 10, and 12. The communications manager 1115 may include slot duration manager 1120, FDD communication manager 1125, transmission manager 1130, HARQ manager 1135, mini-slot manager 1140, TDD communication manager 1145, reception manager 1150, multi-slot HARQ manager 1155, and grant manager 1160. Each of these modules may communicate, directly or indirectly, with one another (e.g., via one or more buses).

Slot duration manager 1120 may identify a duration of a slot used for communications with a receiving device. FDD communication manager 1125 may determine that the communications with the receiving device includes FDD communications.

Transmission manager 1130 may transmit communications to the receiving device during a first portion of the slot, a duration of the first portion being less than the duration of the slot and the duration of the first portion is based on the determination that the communications include FDD communications. Transmission manager 1130 may select a duration for a second portion of the slot based on receiving a HARQ feedback message during the second portion of the slot. Transmission manager 1130 may transmit, according to the HARQ scheme, a HARQ message to the receiving device during a second portion of the slot, the HARQ message transmitted based on the received communications. In some cases, the communications with the receiving device include uplink communications. In some cases, the communications with the receiving device include downlink communications.

HARQ manager 1135 may select, based on the determination that the communications include FDD communications and that the communications are transmitted during the first portion of the slot, a HARQ scheme to use during the communications. HARQ manager 1135 may receive, based on the HARQ scheme, a HARQ feedback message from the receiving device during a second portion of the slot. In some cases, the HARQ scheme includes communicating a HARQ feedback message during the slot. In some cases, the HARQ scheme includes communicating a HARQ feedback message during a slot that occurs subsequent in time to the slot.

HARQ manager 1135 may receive a signal indicating a pool of available HARQ schemes, wherein the selected HARQ scheme is from the pool of available HARQ schemes. In some cases, the signal is a RRC signal.

Mini-slot manager 1140 may configure a mini-slot for communications during a second portion of the slot. Mini-slot manager 1140 may multiplex the mini-slot and the communications transmitted during the first portion of the slot, where the multiplexing includes time division multiplexing. In some cases, the communications during the mini-slot are for the receiving device or for a different receiving device. In some cases, the mini-slot has an associated duration that is substantially the same as a duration for the second portion of the slot. In some cases, the first portion of the slot precedes in time the second portion of the slot. In some cases, the second portion of the slot precedes in time the first portion of the slot.

TDD communication manager 1145 may determine that the slot is configured according to a TDD communications protocol, where a second portion of the slot is selected based on the TDD communications protocol. Reception manager 1150 may receive, during the first portion of the slot, communications from the receiving device.

Multi-slot HARQ manager 1155 may determine that a data transmission in a previous slot was transmitted for a full duration of the previous slot and delay, based on the HARQ scheme, transmission of a control channel during the slot. Grant manager 1160 may transmit a grant message during the first portion of the slot.

Figure 12:
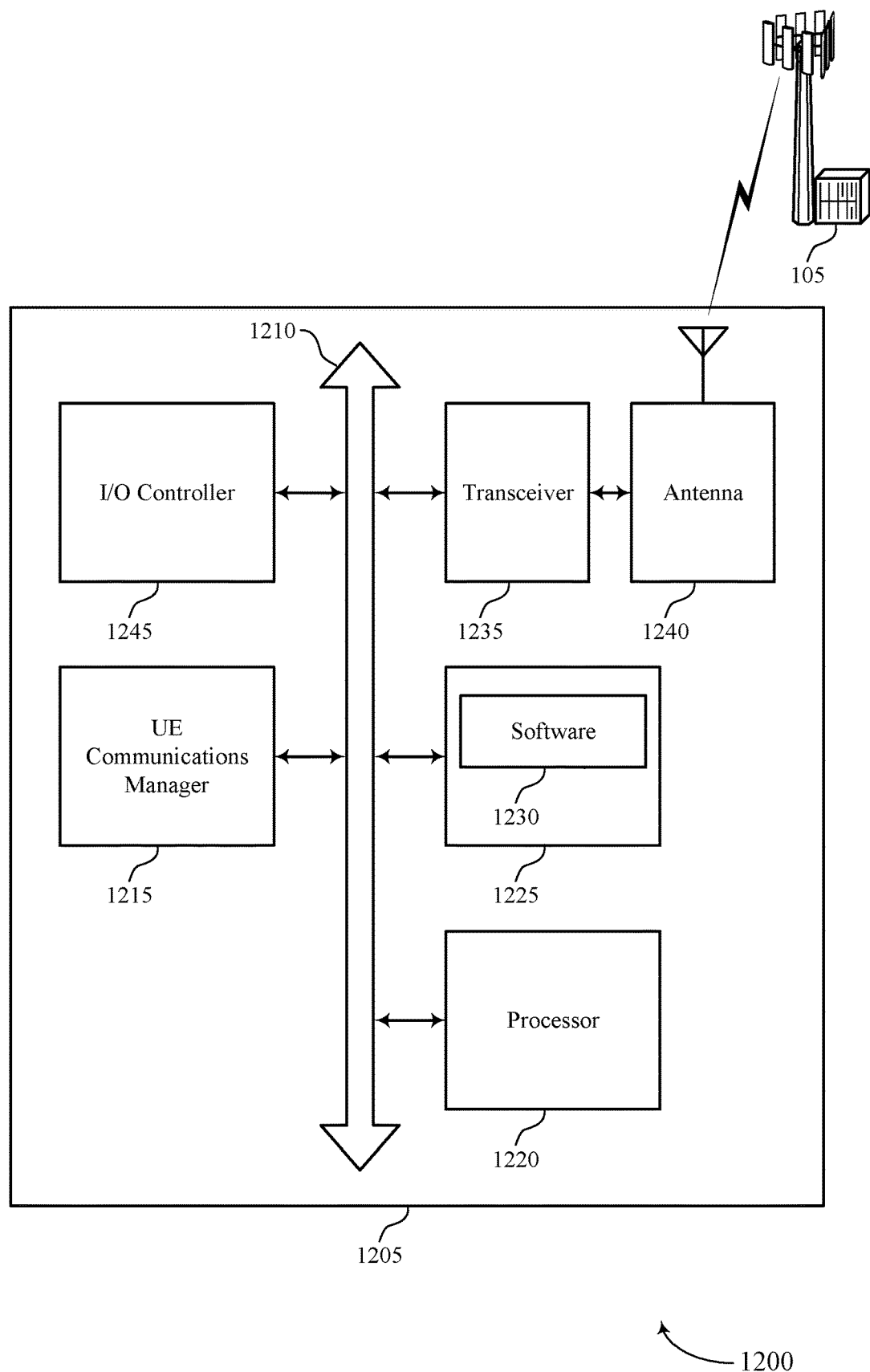
FIG. 12 illustrates a block diagram of a system including a UE that supports FDD HARQ with mini-slots, in accordance with one or more aspects of the present disclosure.

FIG. 12 shows a diagram of a system 1200 including a device 1205 that supports FDD HARQ with mini-slots, in accordance with one or more aspects of the present disclosure. Device 1205 may be an example of or include the components of wireless device 905, wireless device 1005, or a UE 115 as described herein, e.g., a transmitting device. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting FDD HARQ with mini-slots).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware or software operation such as the interaction with peripheral components or devices.

Software 1230 may include code to implement aspects of the present disclosure, including code to support FDD HARQ with mini-slots. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
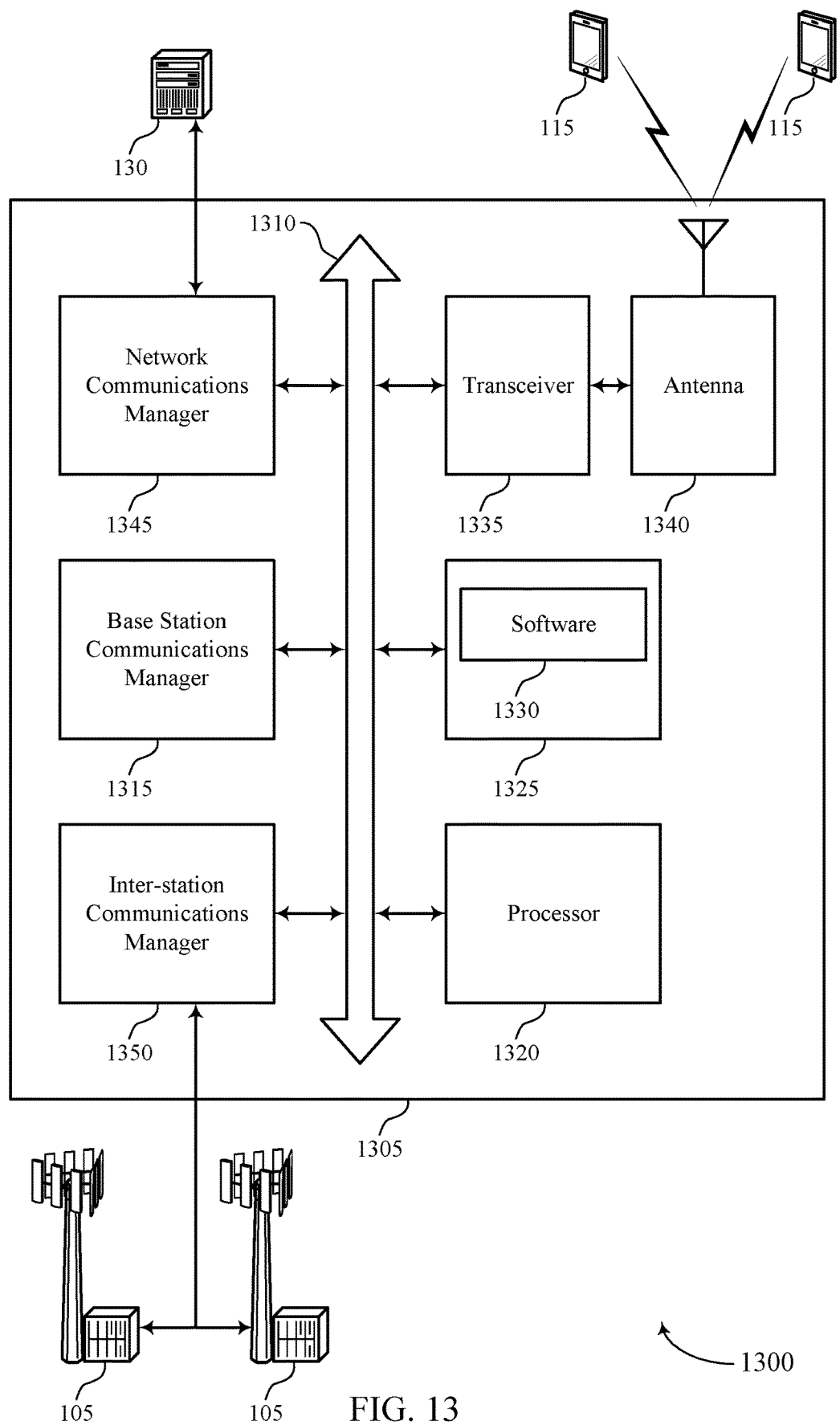
FIG. 13 illustrates a block diagram of a system including a base station that supports FDD HARQ with mini-slots, in accordance with one or more aspects of the present disclosure.

FIG. 13 shows a diagram of a system 1300 including a device 1305 that supports FDD HARQ with mini-slots, in accordance with one or more aspects of the present disclosure. Device 1305 may be an example of or include the components of wireless device 1005, wireless device 1105, or a base station 105 as described herein, e.g., a transmitting device. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting FDD HARQ with mini-slots).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support FDD HARQ with mini-slots. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
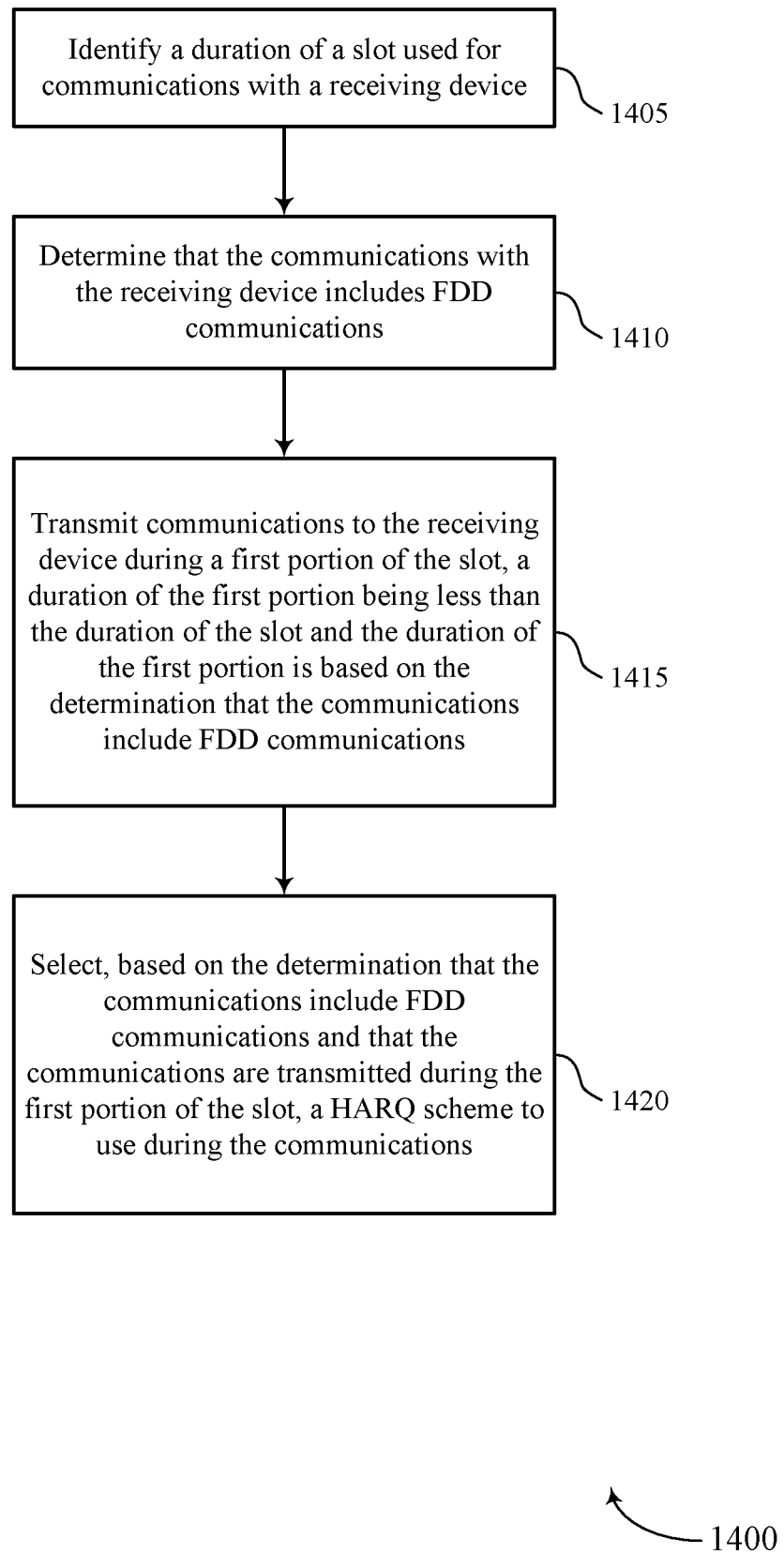
FIGS. 14 through 16 illustrate methods for FDD HARQ with mini-slots, in accordance with one or more aspects of the present disclosure.

FIG. 14 shows a flowchart illustrating a method 1400 for FDD HARQ with mini-slots, in accordance with one or more aspects of the present disclosure. The operations of method 1400 may be implemented by a UE 115 or base station 105 or its components as described herein. For example, the operations of method 1400 may be performed by a communications manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405 the UE 115 or base station 105 may identify a duration of a slot used for communications with a receiving device. The operations of block 1405 may be performed according to the methods described herein. In certain examples, aspects of the operations of block 1405 may be performed by a slot duration manager as described with reference to FIGS. 9 through 11.

At block 1410 the UE 115 or base station 105 may determine that the communications with the receiving device comprises FDD communications. The operations of block 1410 may be performed according to the methods described herein. In certain examples, aspects of the operations of block 1410 may be performed by a FDD communication manager as described with reference to FIGS. 9 through 11.

At block 1415 the UE 115 or base station 105 may transmit communications to the receiving device during a first portion of the slot, a duration of the first portion being less than the duration of the slot and the duration of the first portion is based at least in part on the determination that the communications comprise FDD communications. The operations of block 1415 may be performed according to the methods described herein. In certain examples, aspects of the operations of block 1415 may be performed by a transmission manager as described with reference to FIGS. 9 through 11.

At block 1420 the UE 115 or base station 105 may select, based at least in part on the determination that the communications comprise FDD communications and that the communications are transmitted during the first portion of the slot, a HARQ scheme to use during the communications. The operations of block 1420 may be performed according to the methods described herein. In certain examples, aspects of the operations of block 1420 may be performed by a HARQ manager as described with reference to FIGS. 9 through 11.

Figure 15:
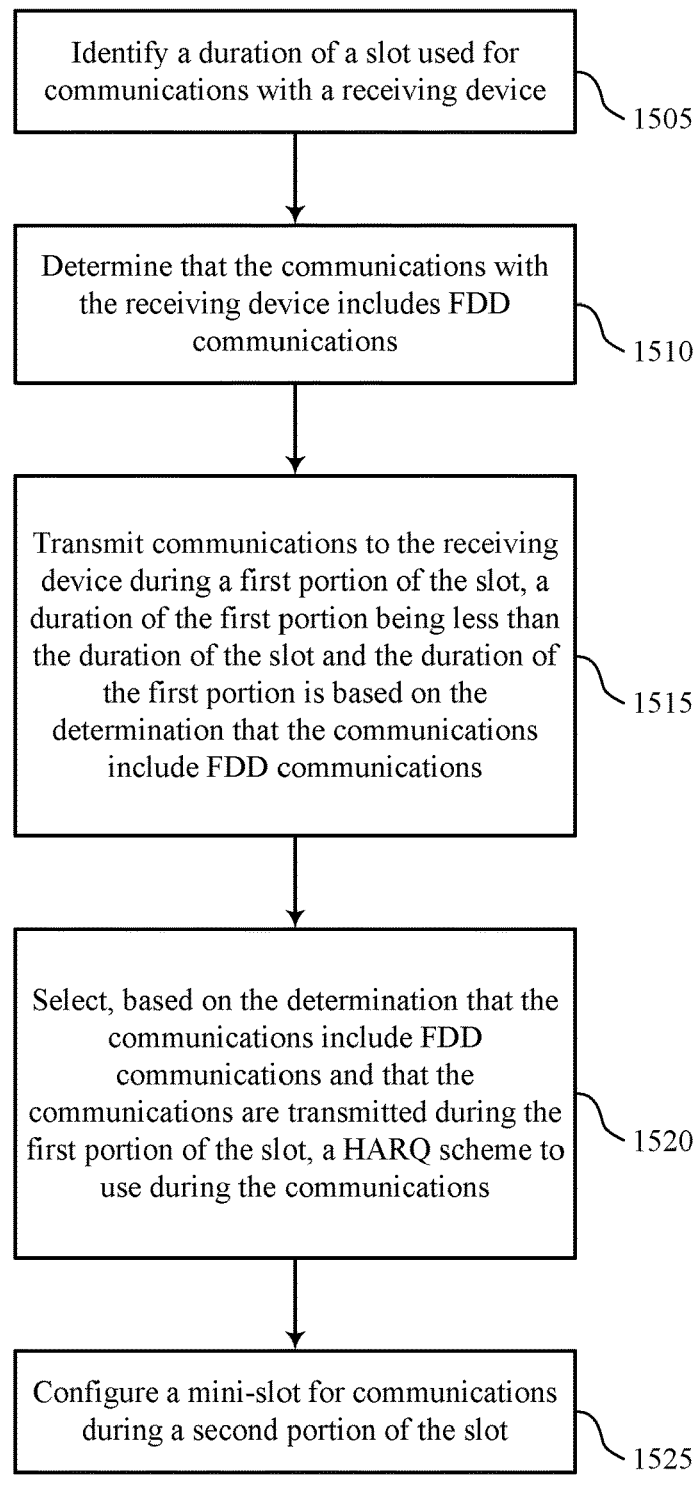

FIG. 15 shows a flowchart illustrating a method 1500 for FDD HARQ with mini-slots, in accordance with one or more aspects of the present disclosure. The operations of method 1500 may be implemented by a UE 115 or base station 105 or its components as described herein. For example, the operations of method 1500 may be performed by a communications manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1505 the UE 115 or base station 105 may identify a duration of a slot used for communications with a receiving device. The operations of block 1505 may be performed according to the methods described herein. In certain examples, aspects of the operations of block 1505 may be performed by a slot duration manager as described with reference to FIGS. 9 through 11.

At block 1510 the UE 115 or base station 105 may determine that the communications with the receiving device comprises FDD communications. The operations of block 1510 may be performed according to the methods described herein. In certain examples, aspects of the operations of block 1510 may be performed by a FDD communication manager as described with reference to FIGS. 9 through 11.

At block 1515 the UE 115 or base station 105 may transmit communications to the receiving device during a first portion of the slot, a duration of the first portion being less than the duration of the slot and the duration of the first portion is based at least in part on the determination that the communications comprise FDD communications. The operations of block 1515 may be performed according to the methods described herein. In certain examples, aspects of the operations of block 1515 may be performed by a transmission manager as described with reference to FIGS. 9 through 11.

At block 1520 the UE 115 or base station 105 may select, based at least in part on the determination that the communications comprise FDD communications and that the communications are transmitted during the first portion of the slot, a HARQ scheme to use during the communications. The operations of block 1520 may be performed according to the methods described herein. In certain examples, aspects of the operations of block 1520 may be performed by a HARQ manager as described with reference to FIGS. 9 through 11.

At block 1525 the UE 115 or base station 105 may configure a mini-slot for communications during a second portion of the slot. The operations of block 1525 may be performed according to the methods described herein. In certain examples, aspects of the operations of block 1525 may be performed by a mini-slot manager as described with reference to FIGS. 9 through 11.

Figure 16:
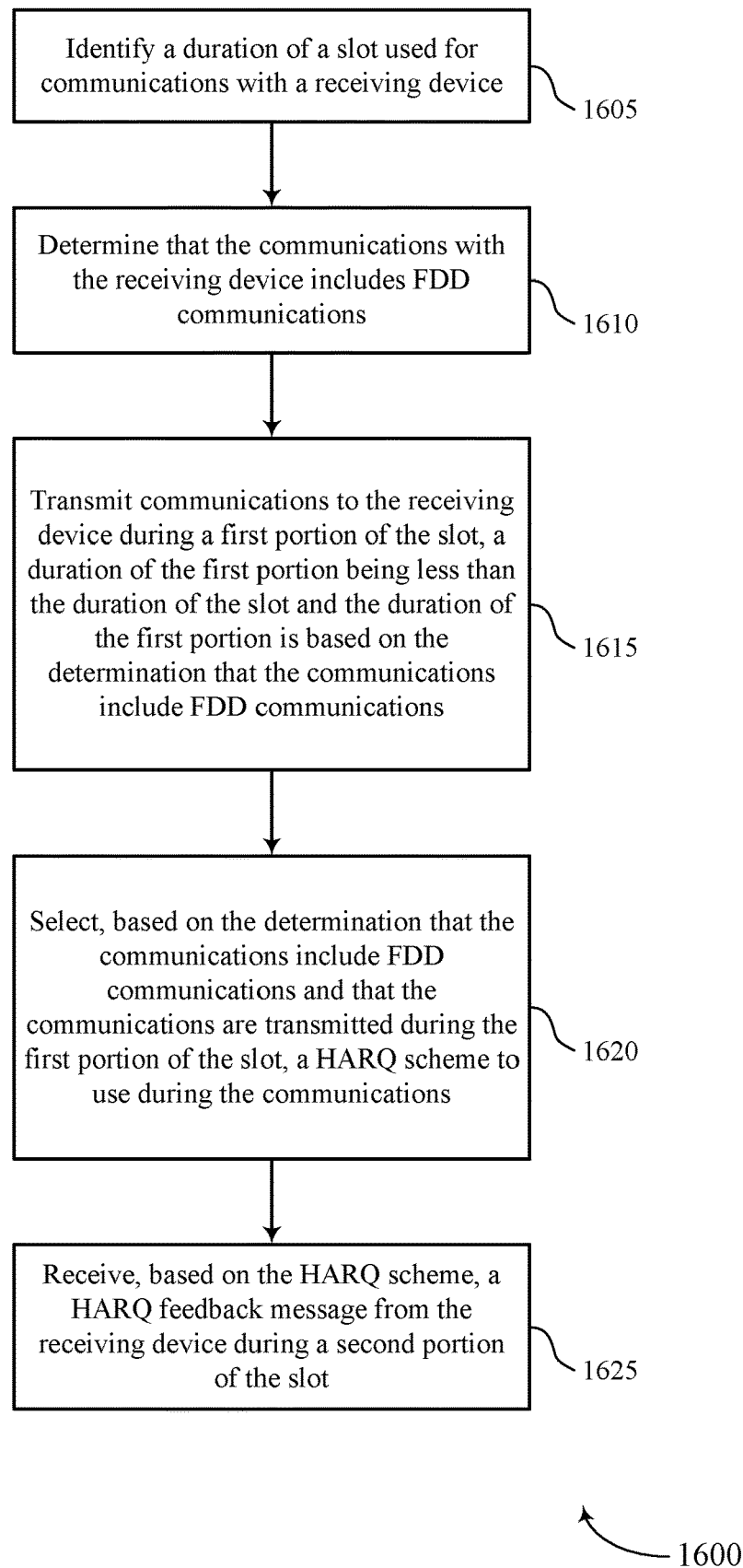

FIG. 16 shows a flowchart illustrating a method 1600 for FDD HARQ with mini-slots, in accordance with one or more aspects of the present disclosure. The operations of method 1600 may be implemented by a UE 115 or base station 105 or its components as described herein. For example, the operations of method 1600 may be performed by a communications manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1605 the UE 115 or base station 105 may identify a duration of a slot used for communications with a receiving device. The operations of block 1605 may be performed according to the methods described herein. In certain examples, aspects of the operations of block 1605 may be performed by a slot duration manager as described with reference to FIGS. 9 through 11.

At block 1610 the UE 115 or base station 105 may determine that the communications with the receiving device comprises FDD communications. The operations of block 1610 may be performed according to the methods described herein. In certain examples, aspects of the operations of block 1610 may be performed by a FDD communication manager as described with reference to FIGS. 9 through 11.

At block 1615 the UE 115 or base station 105 may transmit communications to the receiving device during a first portion of the slot, a duration of the first portion being less than the duration of the slot and the duration of the first portion is based at least in part on the determination that the communications comprise FDD communications. The operations of block 1615 may be performed according to the methods described herein. In certain examples, aspects of the operations of block 1615 may be performed by a transmission manager as described with reference to FIGS. 9 through 11.

At block 1620 the UE 115 or base station 105 may select, based at least in part on the determination that the communications comprise FDD communications and that the communications are transmitted during the first portion of the slot, a HARQ scheme to use during the communications. The operations of block 1620 may be performed according to the methods described herein. In certain examples, aspects of the operations of block 1620 may be performed by a HARQ manager as described with reference to FIGS. 9 through 11.

At block 1625 the UE 115 or base station 105 may receive, based at least in part on the HARQ scheme, a HARQ feedback message from the receiving device during a second portion of the slot. The operations of block 1625 may be performed according to the methods described herein. In certain examples, aspects of the operations of block 1625 may be performed by a HARQ manager as described with reference to FIGS. 9 through 11.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a duration of a slot used for communications with a receiving device;
   determining that the communications with the receiving device during the slot comprises frequency division duplexing (FDD) communications in a time division duplexing (TDD) configured wireless communication system;
   transmitting communications to the receiving device during a first portion of the slot, a duration of the first portion being less than the duration of the slot and the duration of the first portion is based at least in part on the determination that the communications comprise FDD communications; and
   selecting, based at least in part on the determination that the communications comprise FDD communications and that the communications are transmitted during the first portion of the slot, a hybrid automatic repeat request (HARQ) scheme to use during the second portion of the slot, wherein downlink and uplink communications of the FDD communications within the slot are time aligned with TDD communications to configure a duration of the second portion of the slot that supports receiving HARQ feedback in the second portion of the same slot as the transmitted communications based at least in part on the selected HARQ scheme.

2. The method of claim 1, further comprising:
   selecting a duration for a second portion of the slot based at least in part on receiving a HARQ feedback message during the second portion of the slot.

3. The method of claim 1, further comprising:
   configuring a mini-slot for communications during a second portion of the slot.

4. The method of claim 3, wherein the communications during the mini-slot are for the receiving device or for a different receiving device.

5. The method of claim 3, wherein the mini-slot has an associated duration that is substantially the same as a duration for the second portion of the slot.

6. The method of claim 3, further comprising:
   multiplexing the mini-slot and the communications transmitted during the first portion of the slot, wherein the multiplexing comprises time division multiplexing.

7. The method of claim 3, wherein the first portion of the slot precedes in time the second portion of the slot.

8. The method of claim 3, wherein the second portion of the slot precedes in time the first portion of the slot.

9. The method of claim 1, further comprising:
   receiving, based at least in part on the HARQ scheme, a HARQ feedback message from the receiving device during a second portion of the slot.

10. The method of claim 1, further comprising:
    determining that the slot is configured according to a TDD communications protocol, wherein a second portion of the slot is selected based at least in part on the TDD communications protocol.

11. The method of claim 1, further comprising:
    receiving, during the first portion of the slot, communications from the receiving device; and
    transmitting, according to the HARQ scheme, a HARQ message to the receiving device during a second portion of the slot, the HARQ message transmitted based at least in part on the received communications.

12. The method of claim 1, wherein the HARQ scheme comprises communicating a HARQ feedback message during the slot.

13. The method of claim 1, wherein the HARQ scheme comprises communicating a HARQ feedback message during a slot that occurs subsequent in time to the slot.

14. The method of claim 1, further comprising:
determining that a data transmission in a previous slot was transmitted for a full duration of the previous slot; and
delaying, based at least in part on the HARQ scheme, transmission of a control channel during the slot.

15. The method of claim 1, further comprising:
transmitting a grant message during the first portion of the slot.

16. The method of claim 1, wherein the communications with the receiving device comprise uplink communications.

17. The method of claim 1, wherein the communications with the receiving device comprise downlink communications.

18. The method of claim 1, further comprising:
receiving a signal indicating a pool of available HARQ schemes, wherein the selected HARQ scheme is from the pool of available HARQ schemes.

19. The method of claim 18, wherein the signal comprises a radio resource control signal.

20. An apparatus for wireless communication, comprising:
a processor,
memory in electronic communication with the processor; and
instructions stored in the memory and executable by the processor to cause the apparatus to:
identify a duration of a slot used for communications with a receiving device;
determine that the communications with the receiving device during the slot comprises frequency division duplexing (FDD) communications in a time division duplexing (TDD) configured wireless communication system;
transmit communications to the receiving device during a first portion of the slot, a duration of the first portion being less than the duration of the slot and the duration of the first portion is based at least in part on the determination that the communications comprise FDD communications; and
select, based at least in part on the determination that the communications comprise FDD communications and that the communications are transmitted during the first portion of the slot, a hybrid automatic repeat request (HARQ) scheme to use during the second portion of the slot, wherein downlink and uplink communications of the FDD communications within the slot are time aligned with TDD communications to configure a duration of the second portion of the slot that supports receiving HARQ feedback in the second portion of the same slot as the transmitted communications based at least in part on the selected HARQ scheme.

21. The apparatus of claim 20, wherein the instructions are further executable by the processor to cause the apparatus to:
select a duration for a second portion of the slot based at least in part on receiving a HARQ feedback message during the second portion of the slot.

22. The apparatus of claim 20, wherein the instructions are further executable by the processor to cause the apparatus to:
configure a mini-slot for communications during a second portion of the slot.

23. The apparatus of claim 22, wherein the communications during the mini-slot are for the receiving device or for a different receiving device.

24. The apparatus of claim 22, wherein the mini-slot has an associated duration that is substantially the same as a duration for the second portion of the slot.

25. The apparatus of claim 22, wherein the instructions are further executable by the processor to cause the apparatus to:
multiplex the mini-slot and the communications transmitted during the first portion of the slot, wherein the multiplexing comprises time division multiplexing.

26. The apparatus of claim 22, wherein the first portion of the slot precedes in time the second portion of the slot.

27. The apparatus of claim 22, wherein the second portion of the slot precedes in time the first portion of the slot.

28. The apparatus of claim 20, wherein the instructions are further executable by the processor to cause the apparatus to:
receive, based at least in part on the HARQ scheme, a HARQ feedback message from the receiving device during a second portion of the slot.

29. An apparatus for wireless communication, comprising:
means for identifying a duration of a slot used for communications with a receiving device;
means for determining that the communications with the receiving device during the slot comprises frequency division duplexing (FDD) communications in a time division duplexing (TDD) configured wireless communication system;
means for transmitting communications to the receiving device during a first portion of the slot, a duration of the first portion being less than the duration of the slot and the duration of the first portion is based at least in part on the determination that the communications comprise FDD communications; and
means for selecting, based at least in part on the determination that the communications comprise FDD communications and that the communications are transmitted during the first portion of the slot, a hybrid automatic repeat request (HARQ) scheme to use during the second portion of the slot, wherein downlink and uplink communications of the FDD communications within the slot are time aligned with TDD communications to configure a duration of the second portion of the slot that supports receiving HARQ feedback in the second portion of the same slot as the transmitted communications based at least in part on the selected HARQ scheme.

30. A non-transitory computer-readable medium storing code for wireless communication, the code comprising instructions executable by a processor to:
identify a duration of a slot used for communications with a receiving device;
determine that the communications with the receiving device during the slot comprises frequency division duplexing (FDD) communications in a time division duplexing (TDD) configured wireless communication system;
transmit communications to the receiving device during a first portion of the slot, a duration of the first portion being less than the duration of the slot and the duration of the first portion is based at least in part on the determination that the communications comprise FDD communications; and select, based at least in part on the determination that the communications comprise FDD communications and that the communications are transmitted during the first portion of the slot, a hybrid automatic repeat request (HARQ) scheme to use during the second portion of the slot, wherein downlink and uplink communications of the FDD communications within the slot are time aligned with TDD communications to configure a duration of the second portion of the slot that supports receiving HARQ feedback in the second portion of the same slot as the transmitted communications based at least in part on the selected HARQ scheme.

* * * * *